(12) United States Patent
Koizumi et al.

(10) Patent No.: US 10,432,072 B2
(45) Date of Patent: Oct. 1, 2019

(54) DUAL SHAFT INTEGRATED MOTOR

(71) Applicant: NSK Ltd., Tokyo (JP)

(72) Inventors: Kazunori Koizumi, Kanagawa (JP); Hayao Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/074,845

(22) PCT Filed: Jul. 18, 2017

(86) PCT No.: PCT/JP2017/025989
§ 371 (c)(1),
(2) Date: Aug. 2, 2018

(87) PCT Pub. No.: WO2018/016496
PCT Pub. Date: Jan. 25, 2018

(65) Prior Publication Data
US 2019/0068035 A1    Feb. 28, 2019

(30) Foreign Application Priority Data

Jul. 22, 2016 (JP) ................ 2016-143925
Jul. 22, 2016 (JP) ................ 2016-144615

(51) Int. Cl.
*H02K 16/02* (2006.01)
*H02K 21/14* (2006.01)
(Continued)

(52) U.S. Cl.
CPC ............ *H02K 16/02* (2013.01); *H02K 7/003* (2013.01); *H02K 7/085* (2013.01); *H02K 11/21* (2016.01);
(Continued)

(58) Field of Classification Search
CPC ........ H02K 16/02; H02K 11/21; H02K 7/003; H02K 7/085
See application file for complete search history.

(56) References Cited

U.S. PATENT DOCUMENTS 6,355,999 B1   3/2002   Kichiji et al.
9,080,279 B2   7/2015   Jun et al.
(Continued)

FOREIGN PATENT DOCUMENTS

CN    104040064 A    9/2014
JP    60-166272 U1   11/1985
(Continued)

OTHER PUBLICATIONS

Taiwanese Office Action issued in TW 106124477 dated May 9, 2018.
(Continued)

*Primary Examiner* — Terrance L Kenerly
(74) *Attorney, Agent, or Firm* — Sughrue Mion, PLLC

(57) ABSTRACT

A dual shaft integrated motor including inner and outer rotors independently rotatable and rotating in an identical pivotal direction, the inner and outer rotors each having an output shaft positioned on one end of the pivotal direction, the dual shaft integrated motor includes: a detection unit including a first detection unit detecting a rotation angle of the inner rotor, and a second detection unit detecting a rotation angle of the outer rotor; a bearing unit including a first bearing rotating in conjunction with the inner rotor, and a second bearing rotating in conjunction with the outer rotor; a stator core unit including a first core serving as a stator core of the inner rotor, and a second core serving as a stator core of the outer rotor; and a base to which the detection unit, the bearing unit, and the stator core unit are sequentially attached from the one end.

6 Claims, 15 Drawing Sheets

(51) Int. Cl.
  *H02K 21/22* (2006.01)
  *H02K 16/00* (2006.01)
  *H02K 11/21* (2016.01)
  *H02K 7/00* (2006.01)
  *H02K 7/08* (2006.01)

(52) U.S. Cl.
  CPC ............ *H02K 16/00* (2013.01); *H02K 21/14* (2013.01); *H02K 21/22* (2013.01)

(56) References Cited

U.S. PATENT DOCUMENTS

| | | |
|---|---|---|
| 9,954,416 B2 | 4/2018 | Kataoka et al. |
| 2013/0111676 A1 | 5/2013 | Jun et al. |
| 2015/0015104 A1 | 1/2015 | Kataoka et al. |

FOREIGN PATENT DOCUMENTS

| | | |
|---|---|---|
| JP | 3881351 B2 | 2/2007 |
| JP | 5741606 A | 7/2015 |
| JP | 2015-156801 A | 8/2015 |
| JP | 5780352 B2 | 9/2015 |
| TW | 471214 | 1/2002 |

OTHER PUBLICATIONS

International Search Report of PCT/JP2017/025989 dated Oct. 10, 2017.

Communication dated Aug. 6, 2019 from the U.S. Patent and Trademark Office in counterpart application no. 16/318,877.

DUAL SHAFT INTEGRATED MOTOR

CROSS-REFERENCE TO RELATED APPLICATION

This application is a National Stage of PCT international application Ser. No. PCT/JP2017/025989 filed on Jul. 18, 2017, which designates the United States, incorporated herein by reference, and which is based upon and claims the benefit of priority from Japanese Patent Application No. 2016-143925 filed on Jul. 22, 2016, and Japanese Patent Application No. 2016-144615 filed on Jul. 22, 2016, the entire contents of which are incorporated herein by reference.

BACKGROUND

1. Technical Field

The present invention relates to a dual shaft integrated motor.

2. Description of the Related Art

A so-called dual shaft integrated motor provided with two independently-rotatable rotors has been known (for example, Prior Art 1).

PRIOR ART

Prior Art 1: JP 5741606 B1

A motor may be provided with a detection unit for detecting a rotation angle of a rotor. In a dual shaft integrated motor, a detection unit is individually provided in each of two rotors. When detection units are provided to such a motor, so-called shaft alignment is performed to align a pivotal direction of an object to be detected by each detection unit with a pivotal direction of each rotor to enhance detection accuracy of rotation angles performed by the detection units. In order to enhance the detection accuracy of rotation angles performed by the detection units, so-called gap adjustment is performed to adjust rotation angles of the rotors detected as 0 degree. Because the shaft alignment and the gap adjustment should be performed on each detection unit, these works need to be performed on two detection units individually in the dual shaft integrated motor. For this reason, there has been a demand for a structure capable of facilitating works to achieve detection accuracy of detection units such as the shaft alignment and the gap adjustment.

An object of the present invention is to provide a dual shaft integrated motor capable of facilitating works to achieve detection accuracy of detection units that detect rotation angles of rotors.

SUMMARY

According to the present invention in order to achieve the above-mentioned purpose, a dual shaft integrated motor including an inner rotor and an outer rotor that are independently rotatable and rotate in an identical pivotal direction, the inner rotor and the outer rotor each having an output shaft positioned on one end of the pivotal direction, the dual shaft integrated motor includes: a detection unit including a first detection unit configured to detect a rotation angle of the inner rotor, and a second detection unit configured to detect a rotation angle of the outer rotor; a bearing unit including a first bearing configured to rotate in conjunction with the inner rotor, and a second bearing configured to rotate in conjunction with the outer rotor; a stator core unit including a first core serving as a stator core of the inner rotor, and a second core serving as a stator core of the outer rotor; and a base to which the detection unit, the bearing unit, and the stator core unit are sequentially attached from the one end.

Accordingly, the detection unit is positioned closer to the one end than the bearing unit and the stator core unit, i.e., positioned close to the output shafts of the inner rotor and the outer rotor, so that shaft alignment of the first detection unit and the second detection unit and gap adjustment of rotation angles at which the inner rotor and the outer rotor are detected as 0 degree can be performed on the output shafts of the dual shaft integrated motor. Accordingly, when the detection unit is accessed at the time of the shaft alignment and the gap adjustment performed on the output shafts, it is possible to prevent the influence of physical shielding due to the arrangement of the bearing unit and the stator core unit, thereby facilitating achievement of the detection accuracy of the detection unit that detects the rotation angles of the two rotors. Since the bearing unit is positioned between the detection unit and the stator core unit, the detection unit and the stator core unit are separated from each other, thereby reducing a magnetic influence from the stator core unit to the detection unit.

According to the present invention, a magnet provided in the inner rotor and the first core each have a shaft length in the pivotal direction longer than a shaft length of a magnet provided in the outer rotor and a shaft length of the second core.

Accordingly, it becomes easier to reduce a difference between output torque of the outer rotor and that of the inner rotor.

According to the present invention, a position of the first detection unit and a position of the second detection unit are identical in the pivotal direction.

Accordingly, a shaft length of the dual shaft integrated motor can be made more compact. Further, neither of the first detection unit and the second detection unit shields the other in the pivotal direction, thereby facilitating achievement of the detection accuracy of the detection unit that detects the rotation angles of the two rotors.

According to the present invention, a position of an edge close to the one end of the first bearing and a position of an edge close to the one end of the second bearing are identical in the pivotal direction.

Accordingly, the shaft length of the dual shaft integrated motor can be made more compact.

According to the present invention, the inner rotor, the stator core unit, and the outer rotor are sequentially arranged from the pivot, being directed outward in a radial direction.

Accordingly, the first core and the second core can be collectively disposed between the inner rotor and the outer rotor, thereby making a diameter of the dual shaft integrated motor more compact.

According to the present invention, the first detection unit includes: a first rotation unit fixed to the inner rotor and configured to rotate together with the inner rotor; and a first fixed portion fixed to the base and configured to detect a rotation angle of the first rotation unit. The second detection unit includes: a second rotation unit fixed to the outer rotor and configured to rotate together with the outer rotor; and a second fixed portion fixed to the base and configured to detect a rotation angle of the second rotation unit. The first rotation unit, the first fixed portion, the second fixed portion, and the second rotation unit are sequentially arranged from the pivot, being directed outward in a radial direction.

Accordingly, the first fixed portion and the second fixed portion can be collectively disposed between the first rotation unit and the second rotation unit, thereby making the diameter of the dual shaft integrated motor more compact.

According to the present invention, the first detection unit and the second detection unit are provided on the one end with a cover configured to cover the first detection unit and the second detection unit.

Accordingly, providing the cover after completing the shaft alignment and the gap adjustment can protect the detection unit.

According to the present invention, it is possible to facilitate works to achieve detection accuracy of a detection unit that detects rotation angles of rotors.

DETAILED DESCRIPTION

Embodiments of the present invention will be described below with reference to the drawings, but the present invention is not limited thereto. Requirements in each of the following embodiments may be combined as appropriate. Some components may not be used in some cases.

First Embodiment

Figure 1:
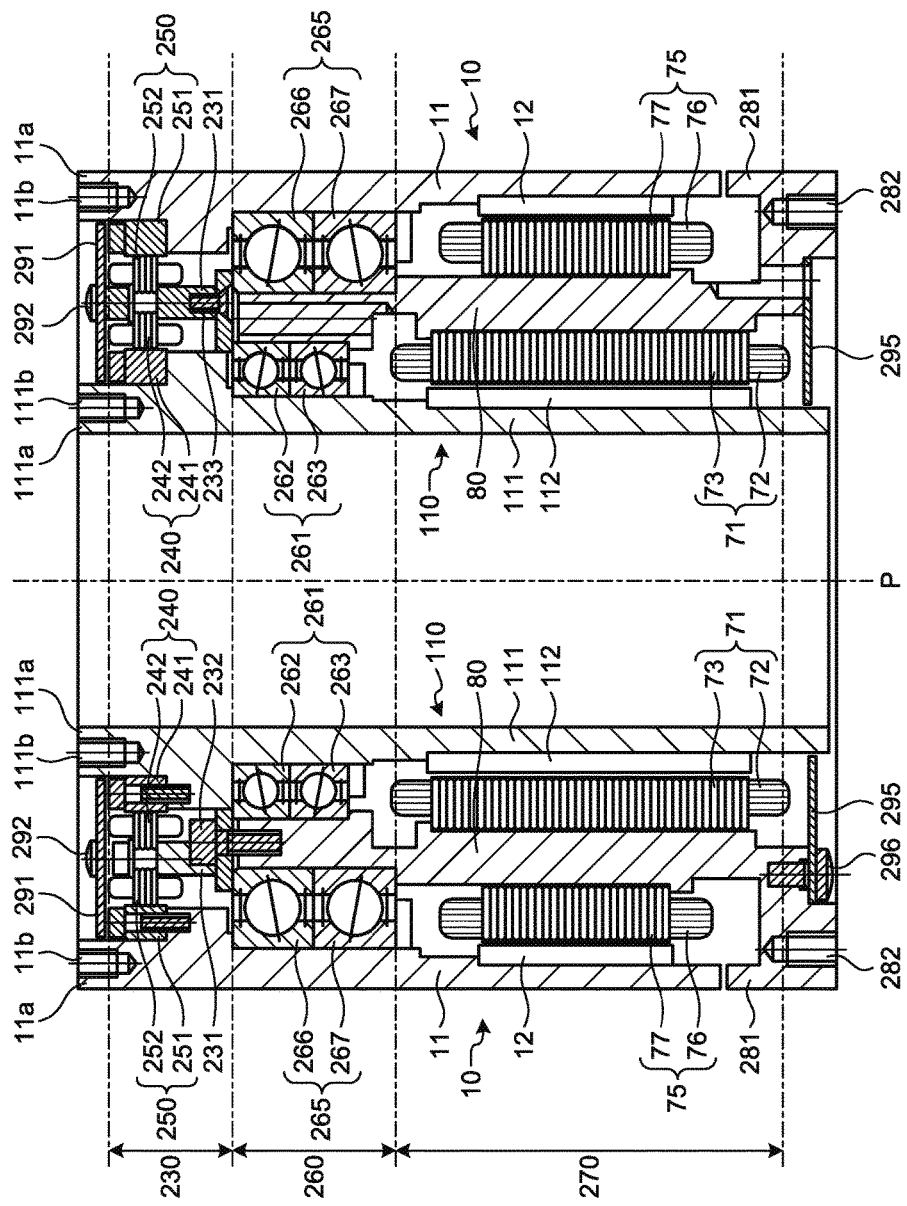
FIG. 1 is a cross-sectional view illustrating a main configuration of a dual shaft integrated motor according to a first embodiment.

FIG. 1 is a cross-sectional view illustrating a main configuration of a dual shaft integrated motor 1 according to a first embodiment. The dual shaft integrated motor 1 includes an inner rotor 110 and an outer rotor 10 that are rotatably provided and rotate in the identical pivotal direction. The inner rotor 110 and the outer rotor 10 each have an output shaft positioned on one end of the pivotal direction. In FIG. 1, the upper side corresponds to the one end of the dual shaft integrated motor 1. FIG. 1 illustrates a cross-section of the dual shaft integrated motor 1 having a circular outline viewed in the pivotal direction (see FIG. 2), the cross-section being obtained by dividing the dual shaft integrated motor 1 into two along a pivot P by a plane that passes through the pivot P.

Figure 2:
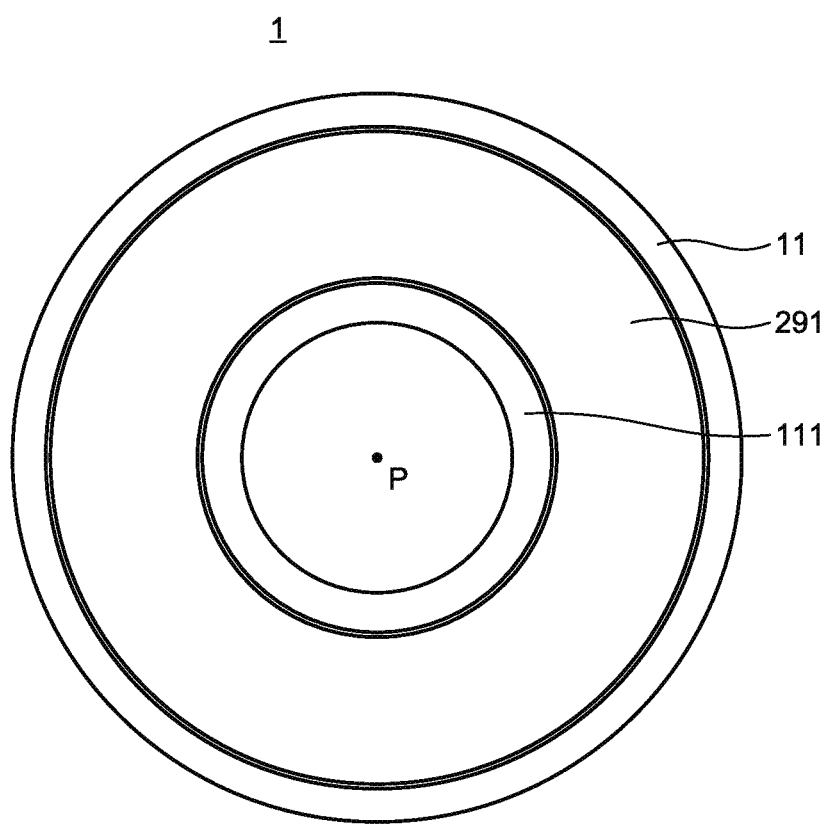
FIG. 2 is a schematic view illustrating an example of a positional relationship among a first rotor yoke, a base with a cover attached thereto, and a second rotor yoke.

FIG. 2 is a schematic view illustrating an example of a positional relationship among a first rotor yoke 111, a base 80 with a cover 291 attached thereto, and a second rotor yoke 11. FIG. 2 illustrates the positional relationship when viewed from the output shaft. In the first embodiment, a pivot of the first rotor yoke 111 and a pivot of the second rotor yoke 11 are identical to be the pivot P. The base 80 to which the cover 291 is fixed is interposed between the first rotor yoke 111 and the second rotor yoke 11 so that the first rotor yoke 111 and the second rotor yoke 11 are independently rotatable on the inner periphery and the outer periphery of the base 80, respectively.

In the first embodiment, the inner rotor 110 and the outer rotor 10 each include a cylindrical rotor yoke, and magnets provided in the rotor yoke. Specifically, as illustrated in FIG. 1, the inner rotor 110 includes the cylindrical first rotor yoke 111, and a plurality of magnets 112 annularly arranged along the outer periphery of the first rotor yoke 111. The outer rotor 10 includes the cylindrical second rotor yoke 11, and a plurality of magnets 12 annularly arranged along the inner periphery of the second rotor yoke 11.

The inner rotor 110 has a shaft length in the pivotal direction longer than that of the outer rotor 10. Specifically, on the outer periphery of the dual shaft integrated motor 1 on which the second rotor yoke 11 is provided, an extension 281 that is a part of the base 80 extends from the side close to the other end. The second rotor yoke 11 is not in contact with the extension 281. On the inner periphery of the dual shaft integrated motor 1 on which the first rotor yoke 111 is provided, other constituents of the dual shaft integrated motor 1 are not disposed. The first rotor yoke 111 provided on the inner periphery has a width in the pivotal direction substantially equal to a width from the one end to the other end of the dual shaft integrated motor 1. On the other hand, the second rotor yoke 11 has a width in the pivotal direction narrower than that of the first rotor yoke 111, according to a width of the extension 281 in the pivotal direction.

The magnitude of output torque of an electric motor is relative to a distance from the pivot P to a thrust generation position (between a magnet and a coil). For this reason, torque in the outer rotor 10 tends to be relatively larger than torque in the inner rotor 110. In the first embodiment, a shaft length of each magnet 112 and that of a first core 71 provided in the inner rotor 110 are longer than a shaft length of each magnet 12 and that of a second core 75 provided in the outer rotor 10 so as to make thrust in the inner rotor 110 greater than thrust in the outer rotor 10. Accordingly, in the first embodiment, a difference between output torque of the outer rotor 10 and that of the inner rotor 110 is reduced.

A screw hole 111*b* is provided in an output terminal 111*a* of the inner rotor 110 on the one end of the first rotor yoke 111, and a screw hole 11*b* is provided in an output terminal 11*a* of the outer rotor 10 on the one end of the second rotor yoke 11. A driven body is screwed into each of the inner rotor 110 provided with the screw hole 111*b* and the outer rotor 10 provided with the screw hole 11*b*, so that rotational driving force is transmitted to the driven body.

The dual shaft integrated motor 1 includes the base 80 and also includes a detection unit 230, a bearing unit 260, and a stator core unit 270 that are sequentially attached to the base 80 from the one end. When viewed in the cross-section illustrated in FIG. 1, the detection unit 230, the bearing unit 260, and the stator core unit 270 are arranged coaxially. More specifically, the detection unit 230, the bearing unit 260, and the stator core unit 270 attached to the base 80 are aligned between the inner rotor 110 and the outer rotor 10 along the pivotal direction.

In the detection unit 230 of the first embodiment, a basal portion 231 provided with a first fixed portion 242 and a second fixed portion 252 is fixed to the base 80 so that the first fixed portion 242 and the second fixed portion 252 are fixed to the base 80. More specifically, the basal portion 231 is attached to the base 80 with fasteners 232 and 233.

The detection unit 230 includes the first detection unit 240 and the second detection unit 250. The first detection unit 240 detects a rotation angle of the inner rotor 110. Specifically, the first detection unit 240 includes a first rotation unit 241, and the first fixed portion 242. The first rotation unit 241 is fixed to the inner rotor 110 and rotates together with the inner rotor 110. The first fixed portion 242 is fixed to the base 80 through the basal portion 231 and detects a rotation angle of the first rotation unit 241. More specifically, the first detection unit 240 is, for example, a resolver. The first rotation unit 241 is, for example, fixed on the outer periphery of the inner rotor 110 at a position closer to the one end than the bearing unit 260 and the stator core unit 270. The first rotation unit 241 includes a magnet, and the magnet rotates with respect to the first fixed portion 242 as the inner rotor 110 rotates. The first fixed portion 242 is fixed at a position closer to the outer periphery than the first rotation unit 241 in a radial direction. The first fixed portion 242 includes a coil that generates electromagnetic induction according to the movement of the magnet caused by the rotation of the first rotation unit 241. Based on the output from the coil of the first fixed portion 242, the first detection unit 240 detects the rotation angle of the inner rotor 110 to which the first rotation unit 241 is fixed.

The second detection unit 250 detects a rotation angle of the outer rotor 10. Specifically, the second detection unit 250 includes a second rotation unit 251, and the second fixed portion 252. The second rotation unit 251 is fixed to the outer rotor 10 and rotates together with the outer rotor 10. The second fixed portion 252 is fixed to the base 80 through the basal portion 231 and detects a rotation angle of the second rotation unit 251. More specifically, the second detection unit 250 is, for example, a resolver. The second rotation unit 251 is, for example, fixed on the inner periphery of the outer rotor 10 at a position closer to the one end than the bearing unit 260 and the stator core unit 270. The second rotation unit 251 includes a magnet, and the magnet rotates with respect to the second fixed portion 252 as the outer rotor 10 rotates. The second fixed portion 252 is fixed at a position closer to the inner periphery than the second rotation unit 251 in the radial direction. The second fixed portion 252 includes a coil that generates electromagnetic induction according to the movement of the magnet caused by the rotation of the second rotation unit 251. Based on the output from the coil of the second fixed portion 252, the second detection unit 250 detects the rotation angle of the outer rotor 10 to which the second rotation unit 251 is fixed.

As illustrated in FIG. 1, in the detection unit 230 of the first embodiment, the positions of the first detection unit 240 and the second detection unit 250 are identical in the pivotal direction. In other words, the first detection unit 240 and the second detection unit 250 are located on the identical plane perpendicular to the pivot P. Furthermore, in the detection unit 230 of the first embodiment, the first rotation unit 241, the first fixed portion 242, the second fixed portion 252, and the second rotation unit 251 are sequentially arranged from the center of the pivot P, being directed outward in the radial direction.

The detection unit 230 of the first embodiment is a resolver, and when the detection unit 230 is attached to the dual shaft integrated motor 1, the shaft alignment and the gap adjustment are performed in order to enhance accuracy of detecting the rotation angles. The shaft alignment and the gap adjustment may require the following works: adjusting a relationship between positions where the inner rotor 110 and the first rotation unit 241 are fixed; adjusting a relationship between positions where the outer rotor 10 and the second rotation unit 251 are fixed; and adjusting a relationship between positions where the first fixed portion 242 and the second fixed portion 252 are fixed with respect to the base 80. In adjusting a positional relationship of each constituent related to the works to perform the works, when other constituents (for example, a stator core and a bearing) are positioned closer to a worker than the detection unit 230, such constituents may interfere with the worker's access to the detection unit 230, which may complicate the works. In the first embodiment, the detection unit 230 is positioned closer to the output shaft than the bearing unit 260 and the stator core unit 270, so that a worker can more smoothly access to the detection unit 230, thereby more easily performing the shaft alignment and the gap adjustment. In this manner, according to the first embodiment, it is possible to easily perform the works to achieve the detection accuracy of the detection unit 230 that detects the rotation angles of the inner rotor 110 and the outer rotor 10.

The cover 291 that covers the first detection unit 240 and the second detection unit 250 is provided closer to the one end than the first detection unit 240 and the second detection unit 250. Specifically, as illustrated in FIGS. 1 and 2, for example, the cover 291 is a plate-like member having an annular shape provided between a cylinder of the inner rotor 110 and a cylinder of the outer rotor 10, being disposed along a plane perpendicular to the pivot P. The cover 291 is fixed to the one end of the detection unit 230 with a fastener such as a screw 292. More specifically, the cover 291 is fixed to the basal portion 231 provided with, for example, the first fixed portion 242 and the second fixed portion 252.

The bearing unit 260 includes a first bearing 261 and a second bearing 265. The first bearing 261 rotates in conjunction with the inner rotor 110. The second bearing 265 rotates in conjunction with the outer rotor 10. Specifically, the bearing unit 260 is positioned between the detection unit 230 and the stator core unit 270 in the pivotal direction. For example, the first bearing 261 is positioned closer to the inner periphery than the base 80 and closer to the outer periphery than the inner rotor 110, and is interposed between the base 80 and the inner rotor 110. With the first bearing 261 interposed between the base 80 and the inner rotor 110, the inner rotor 110 is rotatably supported. For example, the second bearing 265 is positioned closer to the outer periphery than the base 80 and closer to the inner periphery than the outer rotor 10, and is interposed between the base 80 and the outer rotor 10. With the second bearing 265 interposed between the base 80 and the outer rotor 10, the outer rotor 10 is rotatably supported.

In the dual shaft integrated motor 1, a position of an edge of the first bearing 261 close to the one end and a position of an edge of the second bearing 265 close to the one end are identical in the pivotal direction. Specifically, as illustrated in FIG. 1, for example, an edge closer to the one end of the bearing 262, out of the two bearings 262 and 263 included in the first bearing 261, and an edge closer to the one end of the bearing 266, out of the two bearings 266 and 267 included in the second bearing 265, are positioned on the identical plane perpendicular to the pivot P.

The first embodiment has a configuration in which the first bearing 261 is provided with two ball bearings, the bearings 262 and 263, and the second bearing 265 is provided with two ball bearings, the bearings 266 and 267. However, this is merely an example of a specific configuration of the first bearing 261 and the second bearing 265, and the present invention is not limited to this example. Each of the first bearing 261 and the second bearing 265 may have at least one bearing.

The stator core unit 270 has the first core 71 and the second core 75. The first core 71 is a stator core of the inner rotor 110. The second core 75 is a stator core of the outer rotor 10. Specifically, the first core 71 includes: for example, an iron core 73 that is fixed to the inner periphery of the base 80 at a position closer to the other end than the bearing unit 260; and a coil 72 that is wound around the iron core 73. The inner rotor 110 rotates in response to power supplied to the coil 72. The second core 75 includes: for example, an iron core 77 that is fixed to the outer periphery of the base 80 at a position closer to the other end than the bearing unit 260; and a coil 76 that is wound around the iron core 77. The outer rotor 10 rotates in response to power supplied to the coil 76. As illustrated in FIG. 1, in the stator core unit 270 of the first embodiment, the inner rotor 110, the stator core unit 270, and the outer rotor 10 are sequentially arranged from the center of the pivot P, being directed outward in the radial direction.

The base 80 is, for example, a cylindrical member having a diameter larger than that of the inner rotor 110 and smaller than that of the outer rotor 10. As illustrated in FIG. 1, the base 80 may have on its side surfaces (the inner periphery, and the outer periphery) and end surfaces, for example, steps, protrusions, recesses, holes, and the like in accordance with constituents of the detection unit 230, the bearing unit 260, the stator core unit 270, and the like that are fixed to the base 80. In the first embodiment, a ring formed by the outer periphery of the extension 281 has a diameter equal to that of the second rotor yoke 11. In the first embodiment, the extension 281 of the base 80 on the other end has a screw hole 282 used for fixing the dual shaft integrated motor 1 to an object to which the dual shaft integrated motor 1 is to be attached. In the first embodiment, an annular plate-like member 295 positioned on the inner periphery of the extension 281 and on the outer periphery of the inner rotor 110 is fixed to the other end of the base 80. The plate-like member 295 is fixed with a fastener such as a screw 296. These specific configurations are for illustrative purposes, and do not limit the present invention. The configurations may be changed appropriately.

As described above, according to the first embodiment, the detection unit 230 is positioned closer to the one end than the bearing unit 260 and the stator core unit 270, that is, positioned close to the output shafts of the inner rotor 110 and the outer rotor 10, so that the shaft alignment of the first detection unit 240 and the second detection unit 250 and the gap adjustment of the rotation angles at which the inner rotor 110 and the outer rotors 10 are detected as 0 degree can be performed on the output shafts of the dual shaft integrated motor 1. Accordingly, when the detection unit 230 is accessed at the time of the shaft alignment and the gap adjustment performed on the output shafts, it is possible to prevent the influence of physical shielding due to the arrangement of the bearing unit 260 and the stator core unit 270, thereby facilitating achievement of the detection accuracy of the detection unit 230 that detects the rotation angles of the two rotors. In addition, since the bearing unit 260 is positioned between the detection unit 230 and the stator core unit 270, the detection unit 230 and the stator core unit 270 are separated from each other, thereby reducing a magnetic influence from the stator core unit 270 to the detection unit 230.

Each magnet 112 and the first core 71 provided in the inner rotor 110 have the shaft length in the pivotal direction longer than the shaft length of each magnet 12 and that of the second core 75 provided in the outer rotor 10. Accordingly, it becomes easier to reduce a difference between the output torque of the outer rotor 10 and that of the inner rotor 110.

The positions of the first detection unit 240 and the second detection unit 250 are identical in the pivotal direction, thereby making the shaft length of the dual shaft integrated motor 1 more compact. Further, neither of the first detection unit 240 and the second detection unit 250 shields the other in the pivotal direction, thereby facilitating achievement of the detection accuracy of the detection unit 230 that detects the rotation angles of the two rotors.

The position of the edge of the first bearing 261 close to the one end and the position of the edge of the second bearing 265 close to the one end are identical in the pivotal direction, thereby making the shaft length of the dual shaft integrated motor 1 more compact.

The inner rotor 110, the stator core unit 270, and the outer rotor 10 are sequentially arranged from the pivot P, being directed outward in the radial direction. Accordingly, the first core 71 and the second core 75 can be collectively disposed between the inner rotor 110 and the outer rotor 10, thereby making the diameter of the dual shaft integrated motor 1 more compact.

The first rotation unit 241, the first fixed portion 242, the second fixed portion 252, and the second rotation unit 251 are sequentially arranged from the pivot P, being directed outward in the radial direction. Accordingly, the first fixed portion 242 and the second fixed portion 252 can be collectively disposed between the first rotation unit 241 and the second rotation unit 251, thereby making the diameter of the dual shaft integrated motor 1 more compact.

The cover 291 that covers the first detection unit 240 and the second detection unit 250 is provided closer to the one end than the first detection unit 240 and the second detection unit 250. Providing the cover 291 after completing the shaft alignment and the gap adjustment protects the detection unit 230.

Second Embodiment

Figure 3:
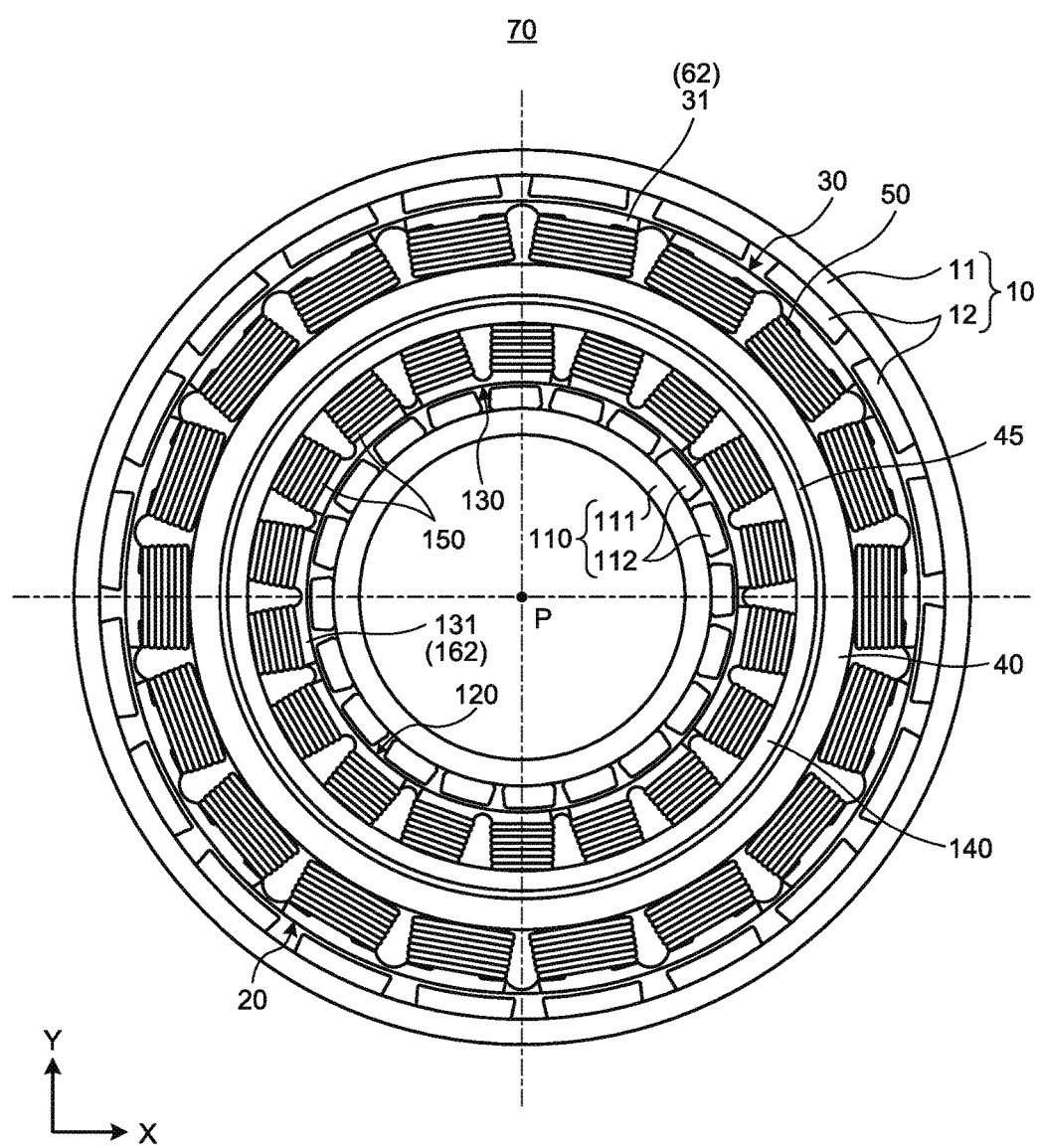
FIG. 3 is a view illustrating an example of a main configuration (stator core unit) of a dual shaft integrated motor according to a second embodiment.
Figure 4:
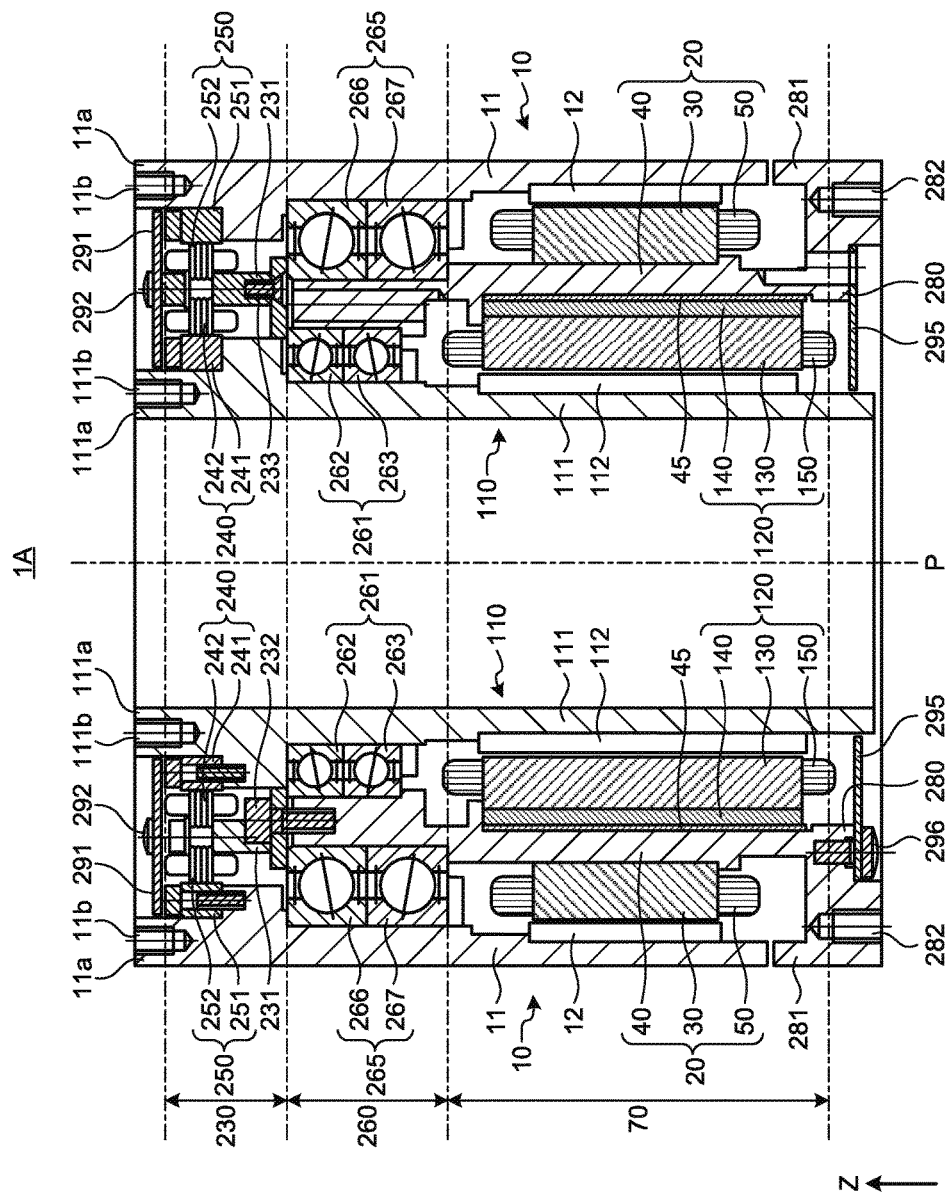
FIG. 4 is a view illustrating an example of a specific configuration of the dual shaft integrated motor.

FIG. 3 is a view illustrating an example of a main configuration (stator core unit 70) of a dual shaft integrated motor 1A according to a second embodiment. FIG. 4 is a view illustrating an example of a specific configuration of the dual shaft integrated motor 1A. The dual shaft integrated motor 1A includes: an inner rotor 110 and an outer rotor 10 that are provided so as to be individually rotatable; an inner stator 120 and an outer stator 20 serving as stators; and a non-magnetic body 45 provided between the inner stator 120 and the outer stator 20. Hereinafter, a pivotal direction of the dual shaft integrated motor 1A may be referred to as a "Z direction" in this embodiment with reference to the drawings. Two directions perpendicular to each other along a plane perpendicular to the Z direction may be referred to as an "X direction" and a "Y direction".

The inner rotor 110 and the outer rotor 10 are rotatably provided and rotate in the identical pivotal direction. Specifically, the inner rotor 110 includes a cylindrical inner rotor yoke 111, and magnets 112 annularly arranged along the outer periphery of the inner rotor yoke 111. The outer rotor 10 includes a cylindrical outer rotor yoke 11, and magnets 12 annularly arranged along the inner periphery of the outer rotor yoke 11. Although the inner rotor 110 and the outer rotor 10 according to the second embodiment share a pivot P, the inner rotor 110 and the outer rotor 10 may have different pivots at different positions.

The inner stator 120 includes an inner motor core 130 provided with coils 150. The inner rotor 110 rotates in response to power supplied to the coils 150 of the inner motor core 130. The outer stator 20 includes an outer motor core 30 provided with coils 50. The outer rotor 10 rotates in response to power supplied to the coils 50 of the outer motor core 30.

The inner stator 120 of the second embodiment includes a cylindrical inner stator back yoke 140 provided outside the inner motor core 130. In addition, the outer stator 20 of the second embodiment includes a cylindrical outer stator back yoke 40 provided inside the outer motor core 30. The inner stator back yoke 140 and the outer stator back yoke 40 of the second embodiment are cylindrical members provided in an integrated manner in the pivotal direction, and are made of, for example, iron or a dust core.

In the dual shaft integrated motor 1A of the second embodiment, these constituents, i.e., the inner rotor 110, the inner stator 120, the non-magnetic body 45, the outer stator 20, and the outer rotor 10 are sequentially arranged from the inside to the outside of a diameter centering on the pivot P. The non-magnetic body 45 of the second embodiment is located, for example, between the inner motor core 130 and the outer motor core 30. More specifically, the non-magnetic body 45 is positioned between the inner stator back yoke 140 and the outer stator back yoke 40 and is fixed to at least one of the inner stator back yoke 140 and the outer stator back yoke 40. In this manner, the non-magnetic body 45 is interposed at a contiguous position of the inner stator 120 and the outer stator 20 that are disposed in a circumferential direction, centering on the pivot P.

The non-magnetic body 45 is, for example, a member made of a non-magnetic alloy or a resin, or a member made of both of an alloy and a resin. More specifically, the non-magnetic body 45 is a cylindrical member made of at least one of the following materials: an aluminum alloy, a non-magnetic stainless alloy of austenitic stainless steel (such as SUS316, SUS316, and SUS305), and a synthetic resin, for example. In a cylinder of the non-magnetic body 45, a cross-sectional shape in a direction perpendicular to the pivot P centers on the pivot P. When made of an alloy, the non-magnetic body 45 is fixed by, for example, bonding with an adhesive or by thermal insert. When made of a resin, the non-magnetic body 45 may be fixed by fitting and bonding the non-magnetic body 45 formed in advance in a cylindrical shape between the inner stator back yoke 140 and the outer stator back yoke 40. Alternatively, the non-magnetic body 45 may be formed and fixed by filling a resin between the inner stator back yoke 140 and the outer stator back yoke 40.

Figure 5:
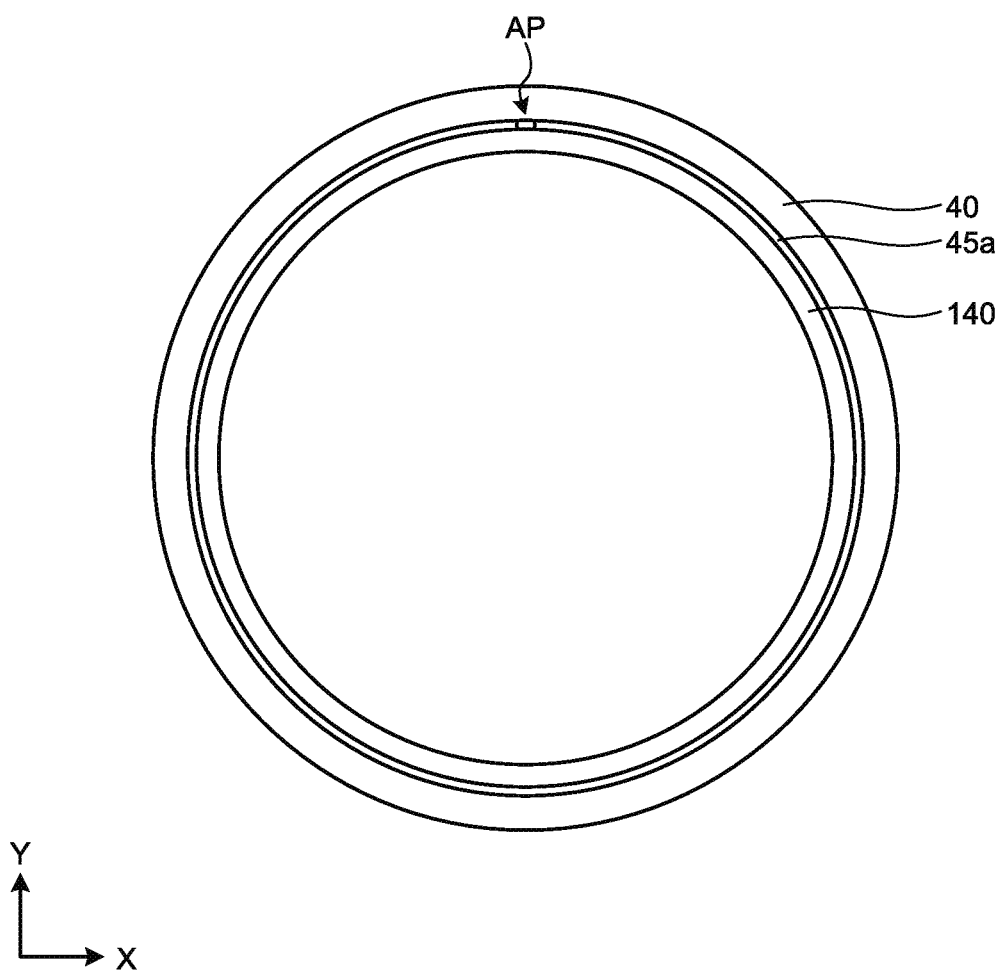
FIG. 5 is a view illustrating an example of a specific shape of a non-magnetic body different from one illustrated in FIG. 3.
Figure 6:
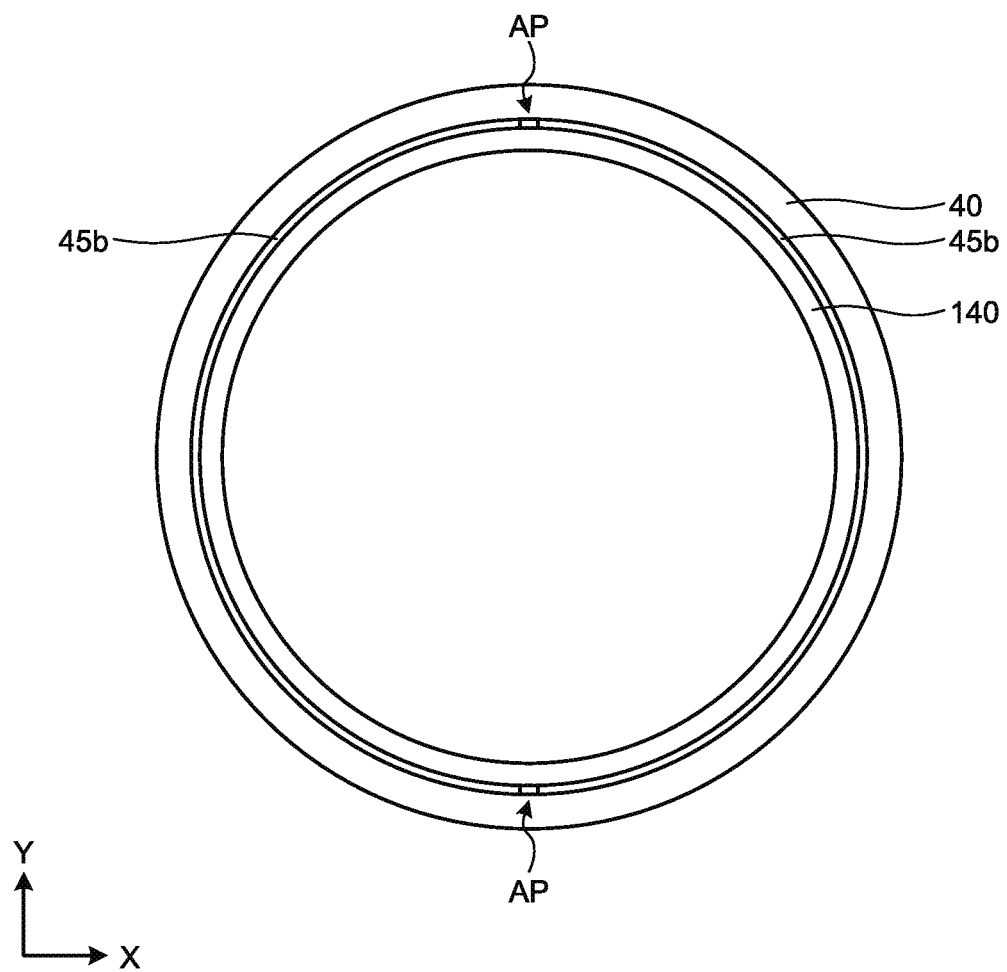
FIG. 6 is a view illustrating an example of a specific shape of the non-magnetic body different from one illustrated in FIG. 3.
Figure 7:
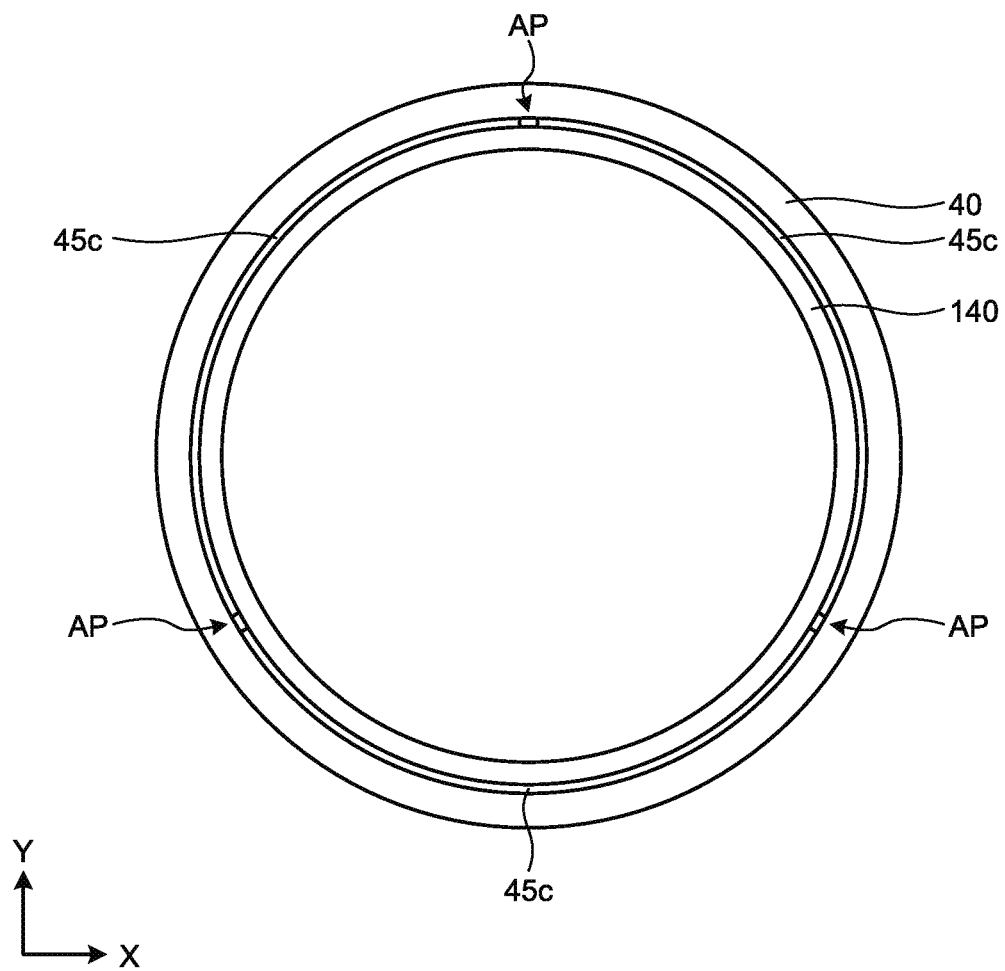
FIG. 7 is a view illustrating an example of a specific shape of the non-magnetic body different from one illustrated in FIG. 3.

FIGS. 5, 6, and 7 are views each illustrating an example of a specific shape of the non-magnetic body different from one illustrated in FIG. 3. The non-magnetic body according to the present invention is not necessarily a continuous cylindrical member that has a continuous annular cross-sectional shape in the direction perpendicular to the pivot P. The non-magnetic body may be an arc-like member. Specifically, as illustrated in FIG. 5, for example, a non-magnetic body 45a may have a discontinuous shape in which a part of a ring in a cross-sectional shape is interrupted. In this case, for example, when the non-magnetic body 45a is made of an alloy, the cylindrical non-magnetic body 45a can be formed more easily by bending a plate-like alloy into an arc-like shape. Alternatively, as illustrated in FIGS. 6 and 7, for example, the non-magnetic body may be formed in a cylindrical shape as a whole by combining a plurality of arc-like members. FIG. 6 illustrates an example in which the non-magnetic body has two non-magnetic members 45b and 45b, and FIG. 7 illustrates an example in which the non-magnetic body has three non-magnetic members 45c, 45c, and 45c. However, these are for illustrative purposes, and do not limit the present invention. The non-magnetic body may include four members or more. The non-magnetic body may have a configuration in which a plurality of members is aligned in the pivotal direction. Discontinuous portions AP in FIGS. 5 to 7 may be voids or portions where the non-magnetic bodies facing each other across the corresponding discontinuous portions AP are in contact with each other. Alternatively, the discontinuous portions AP may be filled with an adhesive or the like. Hereinafter, the non-magnetic bodies 45 and 45a and the non-magnetic members 45b and 45c included in the non-magnetic bodies may be collectively referred to as the "non-magnetic body 45 or the like".

Among the aforementioned constituents, the inner stator 120 and the outer stator 20 are provided, for example, in the stator core unit 70 of the dual shaft integrated motor 1A illustrated in FIG. 4. However, this arrangement is merely an example, and does not limit the dual shaft integrated motor of the present invention. The arrangement may be changed as appropriate.

Hereinafter, a specific configuration example of the dual shaft integrated motor 1A will be described with reference to FIG. 4. The inner rotor 110 has a shaft length in the pivotal direction longer than that of the outer rotor 10. Specifically, on the outer periphery of the dual shaft integrated motor 1A on which the outer rotor yoke 11 is provided, an extension 281 extending from a base 280 that is integrally formed with the outer stator back yoke 40 in the second embodiment extends on the side close to the other end. The outer rotor yoke 11 is not in contact with the extension 281. On the inner periphery of the dual shaft integrated motor 1A on which the inner rotor yoke 111 is provided, other constituents of the dual shaft integrated motor 1A are not disposed. The inner rotor yoke 111 provided on the inner periphery has a width in the pivotal direction substantially equal to a width from the one end to the other end of the dual shaft integrated motor 1A. On the other hand, the outer rotor yoke 11 has a width in the pivotal direction narrower than that of the inner rotor yoke 111, according to a width of the extension 281 in the pivotal direction. The outer stator back yoke 40 and the base 280 may be formed in an integrated manner or may be formed separately.

The magnitude of output torque of an electric motor is relative to a distance from the pivot P to a thrust generation position (between a magnet and a coil). For this reason, torque in the outer rotor 10 tends to be relatively larger than torque in the inner rotor 110. In the second embodiment, a shaft length of each magnet 112 and that of the inner stator 120 provided in the inner rotor 110 are longer than a shaft length of each magnet 12 and that of the outer stator 20 provided in the outer rotor 10 so as to make thrust in the inner rotor 110 greater than thrust in the outer rotor 10. Accordingly, in the second embodiment, a difference between output torque of the outer rotor 10 and that of the inner rotor 110 is reduced.

A screw hole 111*b* is provided in an output terminal 111*a* of the inner rotor 110 on the one end of the inner rotor yoke 111, and a screw hole 11*b* is provided in an output terminal 11*a* of the outer rotor 10 on the one end of the outer rotor yoke 11. A driven body is screwed into each of the inner rotor 110 provided with the screw hole 111*b* and the outer rotor 10 provided with the screw hole 11*b*, so that rotational driving force is transmitted to the driven body.

The dual shaft integrated motor 1A includes a detection unit 230, a bearing unit 260, and a stator core unit 70 that are attached to the outer stator back yoke 40 and are sequentially arranged from the one end. In the cross-section illustrated in FIG. 4, the detection unit 230, the bearing unit 260, and the stator core unit 70 are arranged coaxially. More specifically, the detection unit 230, the bearing unit 260, and the stator core unit 70 attached to the outer stator back yoke 40 are aligned between the inner rotor 110 and the outer rotor 10 along the pivotal direction.

In the detection unit 230 of the second embodiment, a basal portion 231 provided with a first fixed portion 242 and a second fixed portion 252 is fixed to the outer stator back yoke 40 so that the first fixed portion 242 and the second fixed portion 252 are fixed to the outer stator back yoke 40. More specifically, the basal portion 231 is attached to the outer stator back yoke 40 with fasteners 232 and 233.

The detection unit 230 includes a first detection unit 240 and a second detection unit 250. The first detection unit 240 detects a rotation angle of the inner rotor 110. Specifically, the first detection unit 240 includes a first rotation unit 241, and the first fixed portion 242. The first rotation unit 241 is fixed to the inner rotor 110 and rotates together with the inner rotor 110. The first fixed portion 242 is fixed to the outer stator back yoke 40 through the basal portion 231 and detects a rotation angle of the first rotation unit 241. More specifically, the first detection unit 240 is, for example, a resolver. The first rotation unit 241 is, for example, fixed to the outer periphery of the inner rotor 110 at a position closer to the one end than the bearing unit 260 and the stator core unit 70. The first rotation unit 241 includes a magnet, and the magnet rotates with respect to the first fixed portion 242 as the inner rotor 110 rotates. The first fixed portion 242 is fixed at a position closer to the outer periphery than the first rotation unit 241 in a radial direction. The first fixed portion 242 includes a coil that generates electromagnetic induction according to the movement of the magnet caused by the rotation of the first rotation unit 241. Based on the output from the coil of the first fixed portion 242, the first detection unit 240 detects the rotation angle of the inner rotor 110 to which the first rotation unit 241 is fixed.

The second detection unit 250 detects a rotation angle of the outer rotor 10. Specifically, the second detection unit 250 includes a second rotation unit 251, and the second fixed portion 252. The second rotation unit 251 is fixed to the outer rotor 10 and rotates together with the outer rotor 10. The second fixed portion 252 is fixed to the outer stator back yoke 40 through the basal portion 231 and detects a rotation angle of the second rotation unit 251. More specifically, the second detection unit 250 is, for example, a resolver. The second rotation unit 251 is, for example, fixed to the inner periphery of the outer rotor 10 at a position closer to the one end than the bearing unit 260 and the stator core unit 70. The second rotation unit 251 includes a magnet, and the magnet rotates with respect to the second fixed portion 252 as the outer rotor 10 rotates. The second fixed portion 252 is fixed at a position closer to the inner periphery than the second rotation unit 251 in the radial direction. The second fixed portion 252 includes a coil that generates electromagnetic induction according to the movement of the magnet caused by the rotation of the second rotation unit 251. Based on the output from the coil of the second fixed portion 252, the second detection unit 250 detects the rotation angle of the outer rotor 10 to which the second rotation unit 251 is fixed.

As illustrated in FIG. 4, in the detection unit 230 of the second embodiment, the positions of the first detection unit 240 and the second detection unit 250 are identical in the pivotal direction. In other words, the first detection unit 240 and the second detection unit 250 are located on the identical plane perpendicular to the pivot P. Furthermore, in the detection unit 230 of the second embodiment, the first rotation unit 241, the first fixed portion 242, the second fixed portion 252, and the second rotation unit 251 are sequentially arranged from the center of the pivot P, being directed outward in the radial direction.

The detection unit 230 of the second embodiment is a resolver, and when the detection unit 230 is attached to the dual shaft integrated motor 1A, the shaft alignment and the gap adjustment are performed in order to enhance the accuracy of detecting the rotation angles. The shaft alignment and the gap adjustment may require the following works: adjusting a relationship between positions where the inner rotor 110 and the first rotation unit 241 are fixed; adjusting a relationship between positions where the outer rotor 10 and the second rotation unit 251 are fixed; and adjusting a relationship between positions where the first fixed portion 242 and the second fixed portion 252 are fixed with respect to the outer stator back yoke 40. In adjusting a positional relationship of each constituent related to the works to perform the works, when other constituents (for example, a stator core and a bearing) are positioned closer to a worker than the detection unit 230, such constituents may interfere with the worker's access to the detection unit 230, which may complicate the works. In the second embodiment, the detection unit 230 is positioned closer to the output shaft than the bearing unit 260 and the stator core unit 70, so that a worker can more smoothly access to the detection unit 230, thereby more easily performing the shaft alignment and the gap adjustment. In this manner, according to the second embodiment, it is possible to easily perform the works to achieve the detection accuracy of the detection unit 230 that detects the rotation angles of the inner rotor 110 and the outer rotors 10.

A cover 291 that covers the first detection unit 240 and the second detection unit 250 is provided closer to the one end than the first detection unit 240 and the second detection unit 250. Specifically, for example, the cover 291 is a plate-like member having an annular shape provided between a cylinder of the inner rotor 110 and a cylinder of the outer rotor 10, being disposed along a plane perpendicular to the pivot P. The cover 291 is fixed to the one end of the detection unit 230 with a fastener such as a screw 292. More specifically, the cover 291 is fixed to the basal portion 231 provided with, for example, the first fixed portion 242 and the second fixed portion 252.

The bearing unit 260 includes a first bearing 261 and a second bearing 265. The first bearing 261 rotates in conjunction with the inner rotor 110. The second bearing 265 rotates in conjunction with the outer rotor 10. Specifically, the bearing unit 260 is positioned between the detection unit 230 and the stator core unit 70 in the pivotal direction. For example, the first bearing 261 is positioned closer to the inner periphery than the outer stator back yoke 40 and closer to the outer periphery than the inner rotor 110, being interposed between the outer stator back yoke 40 and the inner rotor 110. The first bearing 261 is interposed between the outer stator back yoke 40 and the inner rotor 110, so that the inner rotor 110 is rotatably supported. For example, the second bearing 265 is provided closer to the outer periphery than the outer stator back yoke 40 and closer to the inner periphery than the outer rotor 10, being interposed between the outer stator back yoke 40 and the outer rotor 10. The second bearing 265 is interposed between the outer stator back yoke 40 and the outer rotor 10, so that the outer rotor 10 is rotatably supported.

In the dual shaft integrated motor 1A, a position of an edge of the first bearing 261 close to the one end and a position of an edge of the second bearing 265 close to the one end are identical in the pivotal direction. Specifically, as illustrated in FIG. 4, for example, an edge closer to the one end of the bearing 262, out of the two bearings 262 and 263 included in the first bearing 261, and an edge closer to the one end of the bearing 266, out of the two bearings 266 and 267 included in the second bearing 265, are positioned on the identical plane perpendicular to the pivot P.

The second embodiment has a configuration in which the first bearing 261 is provided with two ball bearings, the bearings 262 and 263, and the second bearing 265 is provided with two ball bearings, the bearings 266 and 267. However, this is merely an example of a specific configuration of the first bearing 261 and the second bearing 265, and the present invention is not limited to this example. Each of the first bearing 261 and the second bearing 265 may have at least one bearing.

Parts of the outer stator back yoke 40 that extend toward the one end or the other end of the stator core unit 70 are provided with steps, protrusions, recesses, holes, and the like in accordance with constituents of the detection unit 230, the bearing unit 260, the stator core unit 70, and the like which are fixed to the outer stator back yoke 40. In the second embodiment, a ring formed by the outer periphery of the extension 281 has a diameter equal to that of the outer rotor yoke 11. In the second embodiment, the base 280 is provided with a screw hole 282 used for fixing the dual shaft integrated motor 1A to an object to which the dual shaft integrated motor 1A is to be attached. In the second embodiment, an annular plate-like member 295 positioned on the inner periphery of the extension 281 and on the outer periphery of the inner rotor 110 is fixed to the base 280. The plate-like member 295 is fixed with a fastener such as a screw 296. These specific configurations are for illustrative purposes, and do not limit the present invention. The configurations may be changed appropriately.

Figure 8:
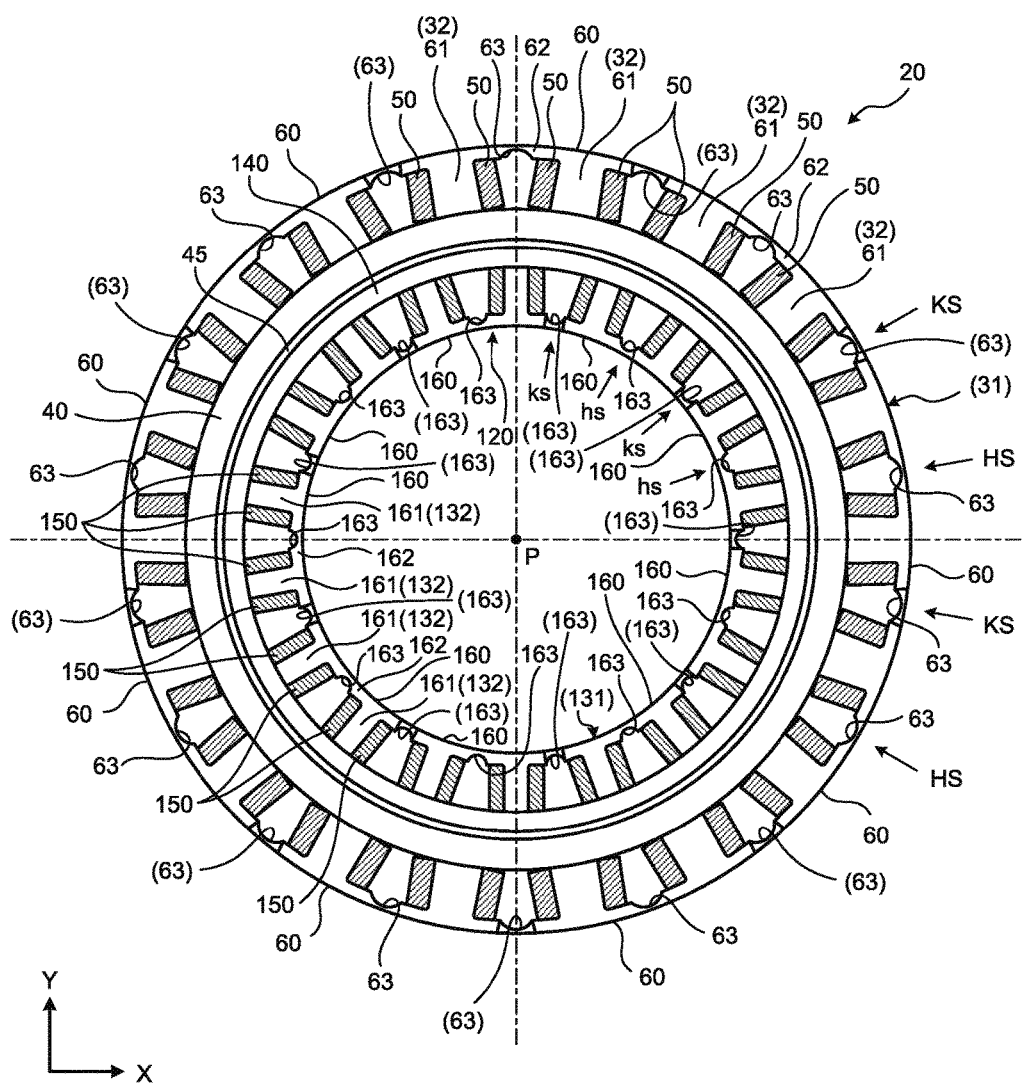
FIG. 8 is a view illustrating an example of a specific structure of a stator according to the second embodiment.

FIG. 8 is a view illustrating an example of a specific structure of a stator according to the second embodiment. A specific configuration example of a stator included in the dual shaft integrated motor 1A will be described with reference to FIGS. 3 and 8, using the outer stator 20 as an example. The outer motor core 30 includes an annular edge 31 positioned on the outer periphery, and four or more core members 32 protruding inward from the edge 31. Each core member 32 is provided with the coil 50. The outer motor core 30 has a laminated structure including laminated magnetic steel sheet layers in which magnetic steel sheets 60, to be described later, are arranged annularly. With the laminated structure, the edge 31 as a whole is disposed to have the cylindrical shape centering on the pivot P. The four or more core members 32 and coils 50 are arranged annularly inside the edge 31, centering on the pivot P. The outer stator back yoke 40 is positioned on the opposite side of the outer rotor 10 with respect to the core members 32.

Figure 9:
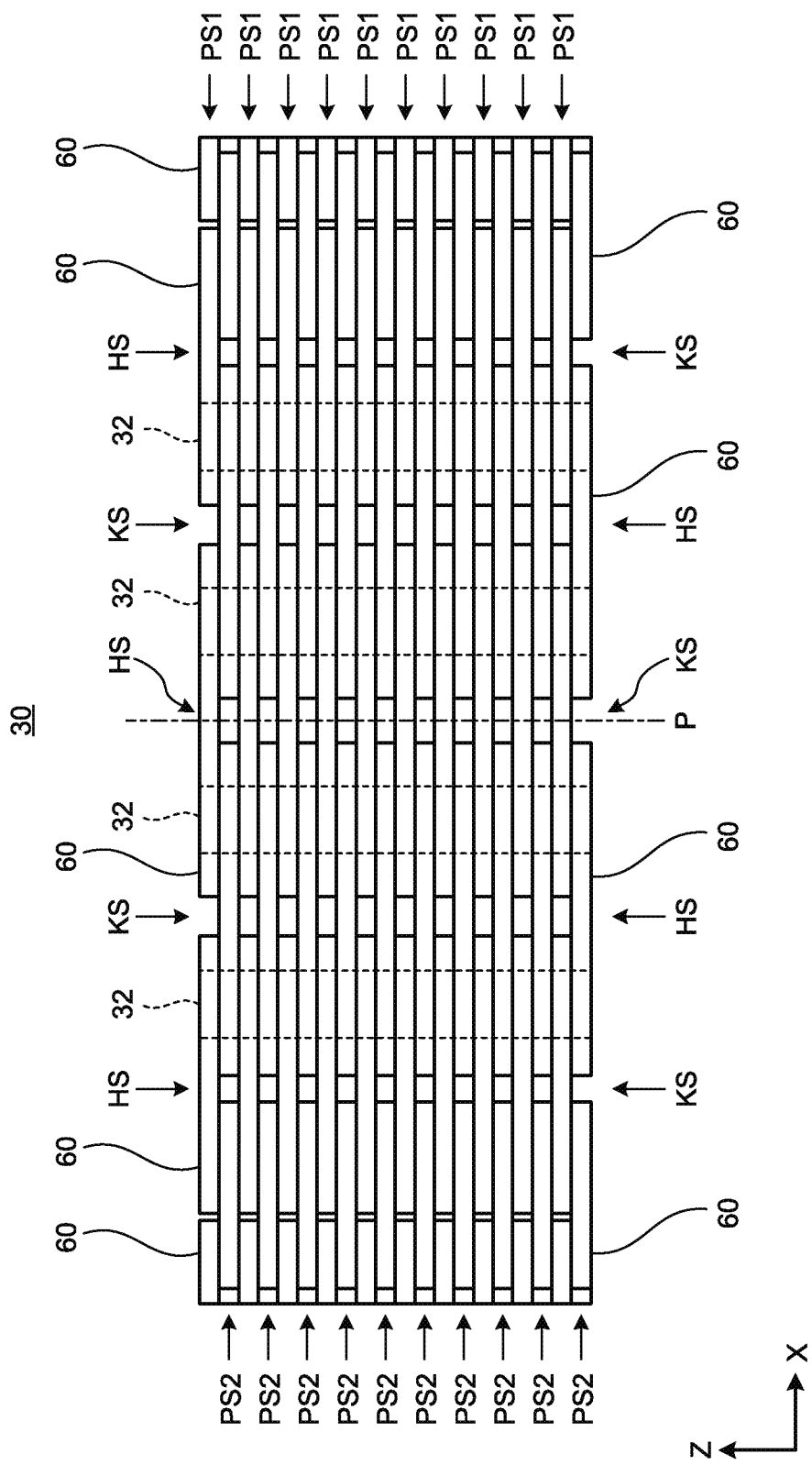
FIG. 9 is a view illustrating a laminated structure of magnetic steel sheet layers included in an outer motor core according to the second embodiment.
Figure 10:
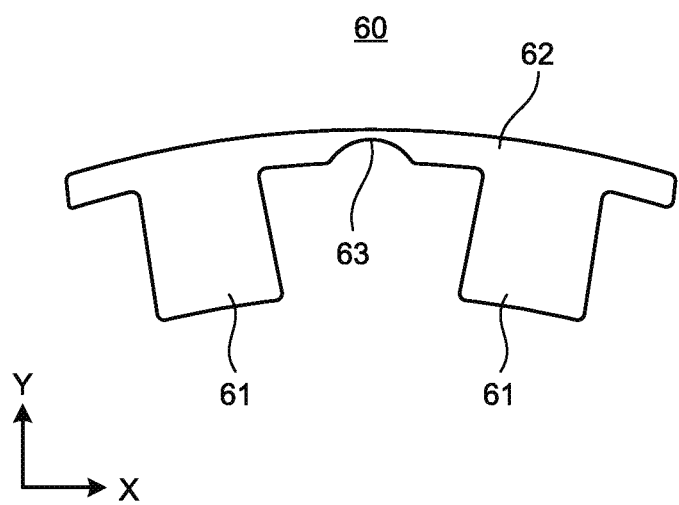
FIG. 10 is a view illustrating a magnetic steel sheet according to the second embodiment.

In FIG. 8, the outer stator 20 and the inner stator 120 are viewed in the Z direction. In FIG. 8, to clearly illustrate teeth 61 and 161 included in each core member 32, winding wires of the coils 50 that are wound around the core members 32 and winding wires of the coils 150 that are wound around the core members 132 in FIG. 3 are partially omitted. FIG. 9 is a view illustrating the laminated structure of the magnetic steel sheet layers included in the outer motor core 30 according to the second embodiment. In FIG. 9, the outer motor core 30 is viewed in a direction perpendicular to the Z direction (for example, the Y direction). FIG. 10 is a view illustrating one magnetic steel sheet 60 according to the second embodiment.

As illustrated in FIG. 9, for example, the outer motor core 30 has a structure in which a plurality of magnetic steel sheet layers is laminated in the Z direction. As illustrated in FIGS. 8 and 9, a plurality of magnetic steel sheets 60 is annularly arranged in one magnetic steel sheet layer. As illustrated in FIGS. 8 and 10, one magnetic steel sheet 60 includes two teeth 61. In the outer motor core 30, the core members 32 of the coils 50 are formed by the laminated structure in which the teeth 61 of the magnetic steel sheets 60 included in each of the magnetic steel sheet layers are laminated. In other words, for example, as illustrated in FIG. 9, the core members 32 each functioning as a core of each coil 50 provided in the outer stator 20 includes the teeth 61 laminated in the Z direction.

As illustrated in FIG. 10, for example, one magnetic steel sheet 60 includes a basal portion 62 that physically connects two teeth 61. Specifically, the basal portion 62 has, for example, an arc-like shape in which the two teeth 61 included in one magnetic steel sheet 60 are positioned at a predetermined distance. With the configuration in which the magnetic steel sheets 60 are annularly arranged in one magnetic steel sheet layer and are laminated, the basal portions 62 come into contact with one another to form the edge 31. In the second embodiment, two teeth 61 included in one magnetic steel sheet 60 are discontinuous on the opposite side of the outer rotor 10. Specifically, as illustrated in FIG. 10 for example, on the opposite side of the basal portion 62, leading ends of adjacent teeth 61 are disposed with a slot therebetween. In this manner, a slot is provided between the teeth 61 protruding from the basal portion 62 in the radial direction of the outer motor core 30. In each magnetic steel sheet 60 arranged in the magnetic steel sheet layer, two teeth 61 protrude toward the opposite side of the outer rotor 10 from the basal portion 62 positioned closer to the rotor than the two teeth 61.

More specifically, in an electric motor of a so-called outer rotor such as a motor positioned close to an outer shaft, each magnetic steel sheet 60 is provided with two teeth 61 protruding inward from the arc of the basal portion 62. The basal portion 62 does not necessarily have an arc-like shape.

For example, as illustrated in FIG. 10 and the like, the basal portion 62 on the side from which the teeth 61 protrude may have a straight line shape perpendicular to the protruding direction of the teeth 61. Two teeth 61 protrude from the basal portion 62, so that the magnetic steel sheet 60 illustrated in FIG. 10 has a shape obtained by, for example, connecting upper portion of two T shapes. The basal portion 62 protruding on both sides in the circumferential direction perpendicularly to the teeth 61 constituting each core member 32, like the upper portion of the T shapes, is configured to lock each coil 50 in the radial direction. Accordingly, it is possible to prevent the winding wires of the coils 50 from extending or protruding in the direction in which the outer rotor 10 is positioned. In the basal portion 62, the upper side of the connected portion of the T-shapes on the opposite side of the side from which the teeth 61 protrude has an arc-like shape.

In the basal portion 62, a part corresponding to a midpoint between two teeth 61 of one magnetic steel sheet 60 is thinner than the other parts. More specifically, for example, the inner side of an intermediate portion 63 corresponding to the midpoint is curved in the radial direction like a curved cross-section of a concave lens, so that the basal portion 62 in the radial direction is tapered. The teeth 61 are laminated along the pivotal direction to form the core members 32, and are provided with the coils 50. However, such a configuration may cause interference of magnetic fields due to magnetism flowing between adjacent coils 50. It is desired to reduce the interference of the magnetic field from a viewpoint of enhancing the efficiency of the dual shaft integrated motor 1A. The magnetism shows a relatively strong tendency to flow in a closed slot HS in which the teeth 61 are physically connected to each other as compared with an open slot KS in which the teeth 61 are not physically connected to each other. The magnetism shows a relatively stronger tendency to flow in the closed slot HS with a higher degree of physical continuity in the closed slot HS. Thus, in the second embodiment, the part corresponding to the midpoint between the teeth 61 is made thinner than the other parts so as to prevent the magnetism from flowing around. Accordingly, it is possible to prevent reduction in efficiency due to interference of the magnetic field, which leads to high efficiency of the dual shaft integrated motor 1A. In FIG. 8, the intermediate portion 63 having the reference numeral in a parenthesis is the intermediate portion 63 of the magnetic steel sheet 60 disposed in a magnetic steel sheet layer different from one with the magnetic steel sheet 60 that includes the intermediate portion 63 having the reference numeral without a parenthesis.

Figure 11:
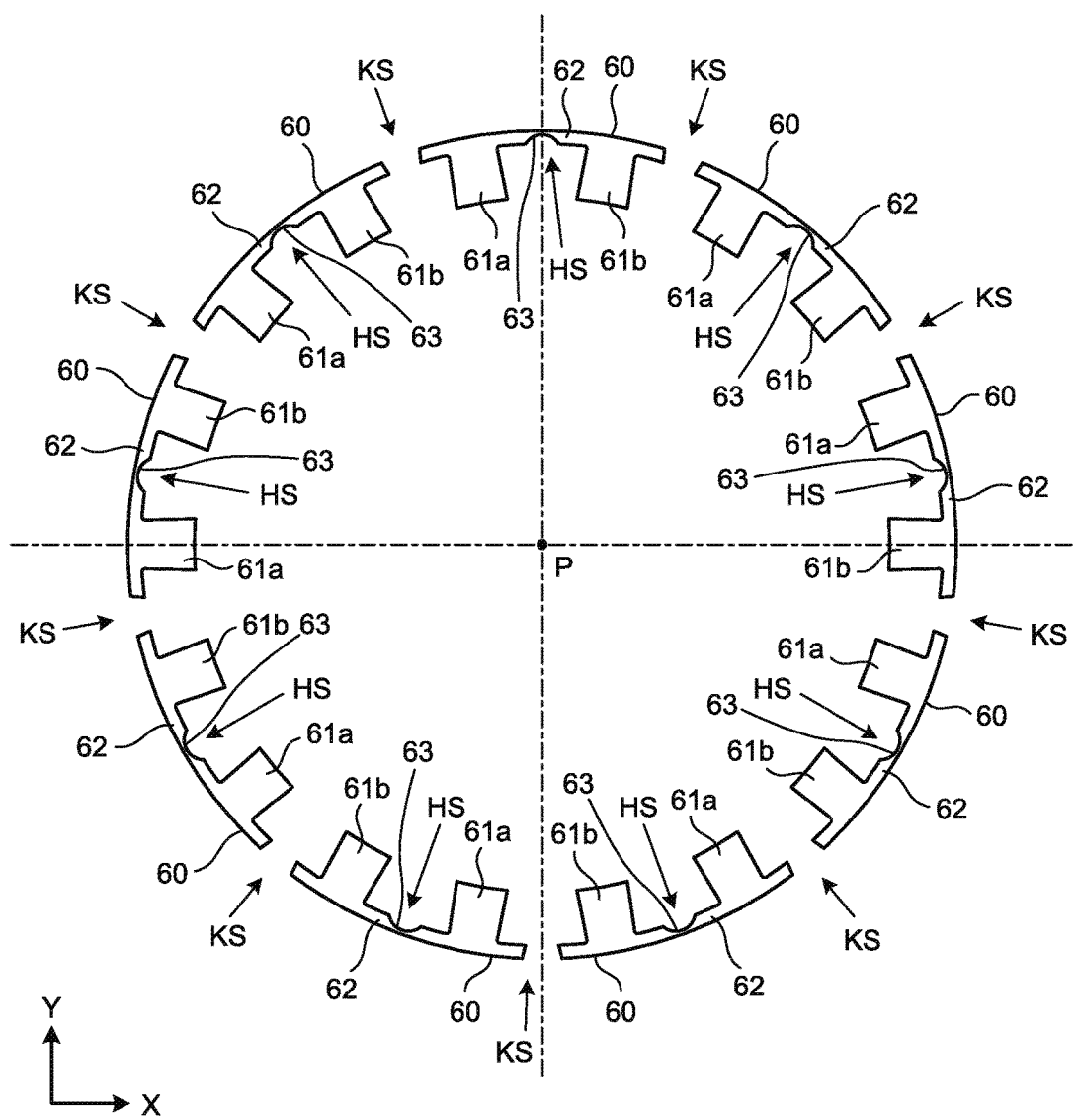
FIG. 11 is a view illustrating one of two phases in an arrangement of a plurality of magnetic steel sheets in one magnetic steel sheet layer.
Figure 12:
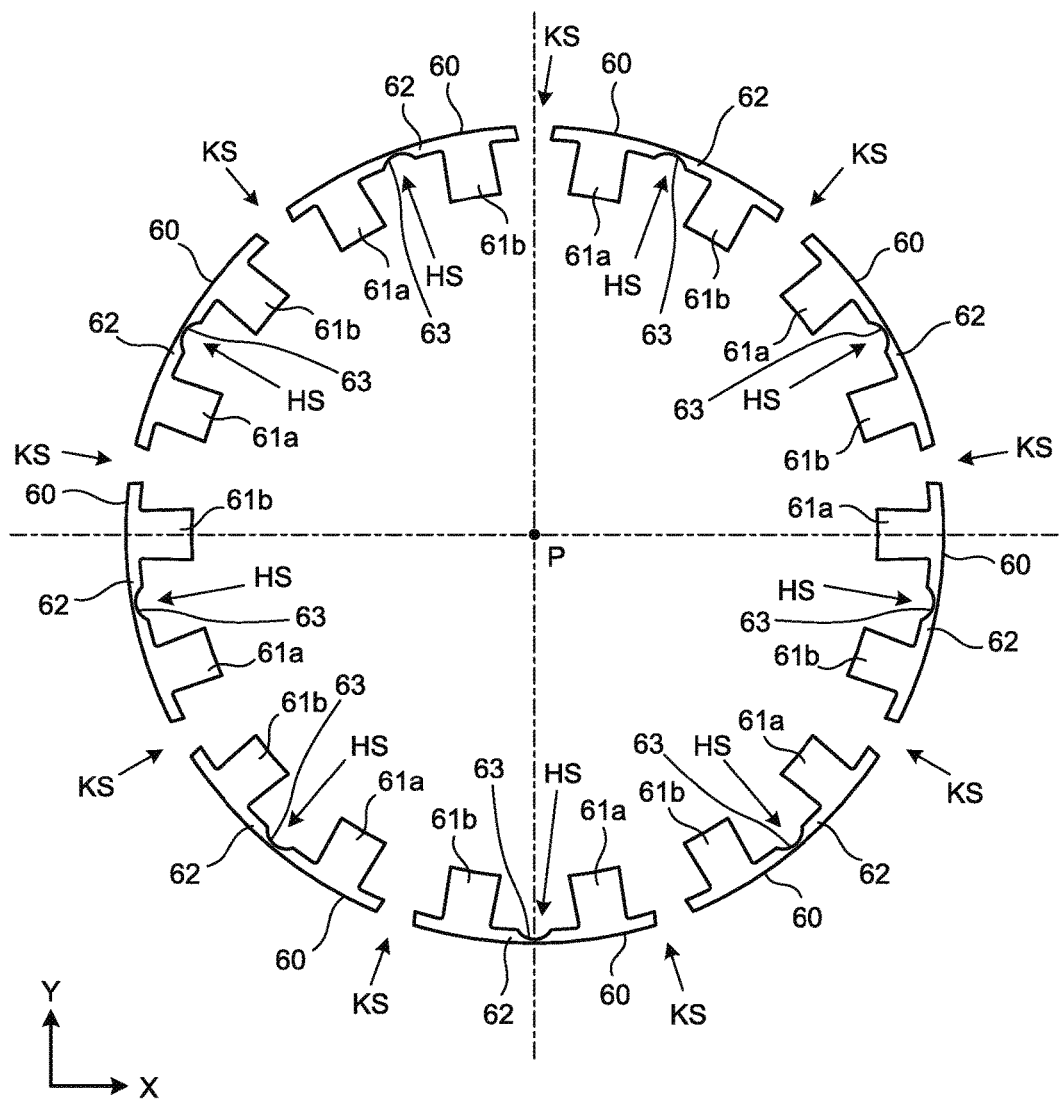
FIG. 12 is a view illustrating the other of the two phases in the arrangement of the magnetic steel sheets in one magnetic steel sheet layer.

FIG. 11 is a view illustrating one of two phases in an arrangement of the magnetic steel sheets 60 in one magnetic steel sheet layer. FIG. 12 is a view illustrating the other of the two phases in the arrangement of the magnetic steel sheets 60 in one magnetic steel sheet layer. A difference between FIG. 11 and FIG. 12 indicates a difference in the arrangement of the magnetic steel sheets 60 in different phases when viewed in the identical direction. Hereinafter, one phase illustrated in FIG. 11 is referred to as a first phase. The other phase illustrated in FIG. 12 is referred to as a second phase. The reference numeral PS1 represents a magnetic steel sheet layer in the first phase. The reference numeral PS2 represents a magnetic steel sheet layer in the second phase.

There are two phases in the arrangement of the magnetic steel sheets 60 in one magnetic steel sheet layer. The outer stator 20 includes the magnetic steel sheet layers in the two phases. More specifically, the two phases in the arrangement of the magnetic steel sheets 60 are shifted from each other by one tooth. Since the two phases in the arrangement of the magnetic steel sheets 60 are shifted by one tooth, the two teeth 61 of one magnetic steel sheet 60 are staggered between the two phases. Specifically, with regard to two teeth 61a and 61b included in one magnetic steel sheet 60, for example, when one of them (tooth 61a) is disposed at a certain position in the first phase, and the other (tooth 61b) is disposed at the identical position in the second phase. Similarly, when one of the teeth 61a and 61b (tooth 61a) included in one magnetic steel sheet 60 is disposed at a certain position in the second phase, the other (tooth 61b) is disposed at the identical position in the first phase. In FIG. 11 and FIG. 12, to distinguish these phases, one of two teeth 61 is denoted by the reference numeral 61a, and the other is denoted by the reference numeral 61b.

In the second embodiment, the magnetic steel sheets 60 are arranged in one magnetic steel sheet layer with a slot therebetween. Specifically, the magnetic steel sheets 60 arranged annularly in one magnetic steel sheet layer are not in contact with each other. More specifically, the magnetic steel sheets 60 are disposed in an annular direction in one magnetic steel sheet layer such that an interval between two teeth 61 of different magnetic steel sheets 60 which are adjacent but not in contact with each other becomes equivalent to an interval between two teeth 61 of one magnetic steel sheet 60. Regardless of whether a slot between two teeth 61 is the closed slot (HS) between two teeth 61 of one magnetic steel sheet 60 or the open slot (KS) between two teeth 61 of different magnetic steel sheets 60 as described above, the annularly arranged teeth 61 are disposed at regular intervals.

In the second embodiment, the magnetic steel sheets 60 are formed so as to uniform the interval between two teeth 61 of different magnetic steel sheets 60 which are adjacent but not in contact with each other and the interval between two teeth 61 of one magnetic steel sheet 60. Specifically, in the basal portion 62, a length of an extended part that connects two teeth 61 included in one magnetic steel sheet 60 is twice as long as or more than twice a length of an extended part protruding from each of the teeth 61 in the opposite direction of the extended part that connects two teeth 61.

In the second embodiment, the phases in the arrangement of the magnetic steel sheets 60 between adjacent magnetic steel sheet layers are different from each other. Specifically, as illustrated in FIG. 9, for example, the outer motor core 30 is formed by alternately laminating the magnetic steel sheet layer PS1 in the first phase and the magnetic steel sheet layer PS2 in the second phase. Therefore, in an axial direction, the open slot KS and the closed slot HS are alternately arranged. In the second embodiment, for example, as illustrated in FIG. 9, the number of the magnetic steel sheet layers in one of the two phases is equal to that in the other of the two phases. In this case, in the outer motor core 30, one layer of two consecutive magnetic steel sheet layers in the pivotal direction has the open slot KS, and the other has the closed slot HS. Such a structure achieves weight saving as compared with a structure of having the completely closed slot HS in which one magnetic steel sheet layer is completely continuous in an annular shape. In addition, such a structure prevents flowing of the magnetism generated between the coils 50 provided in the core members 32 formed by laminating the teeth 61, thereby enhancing the efficiency of the dual shaft integrated motor 1A.

Figure 13:
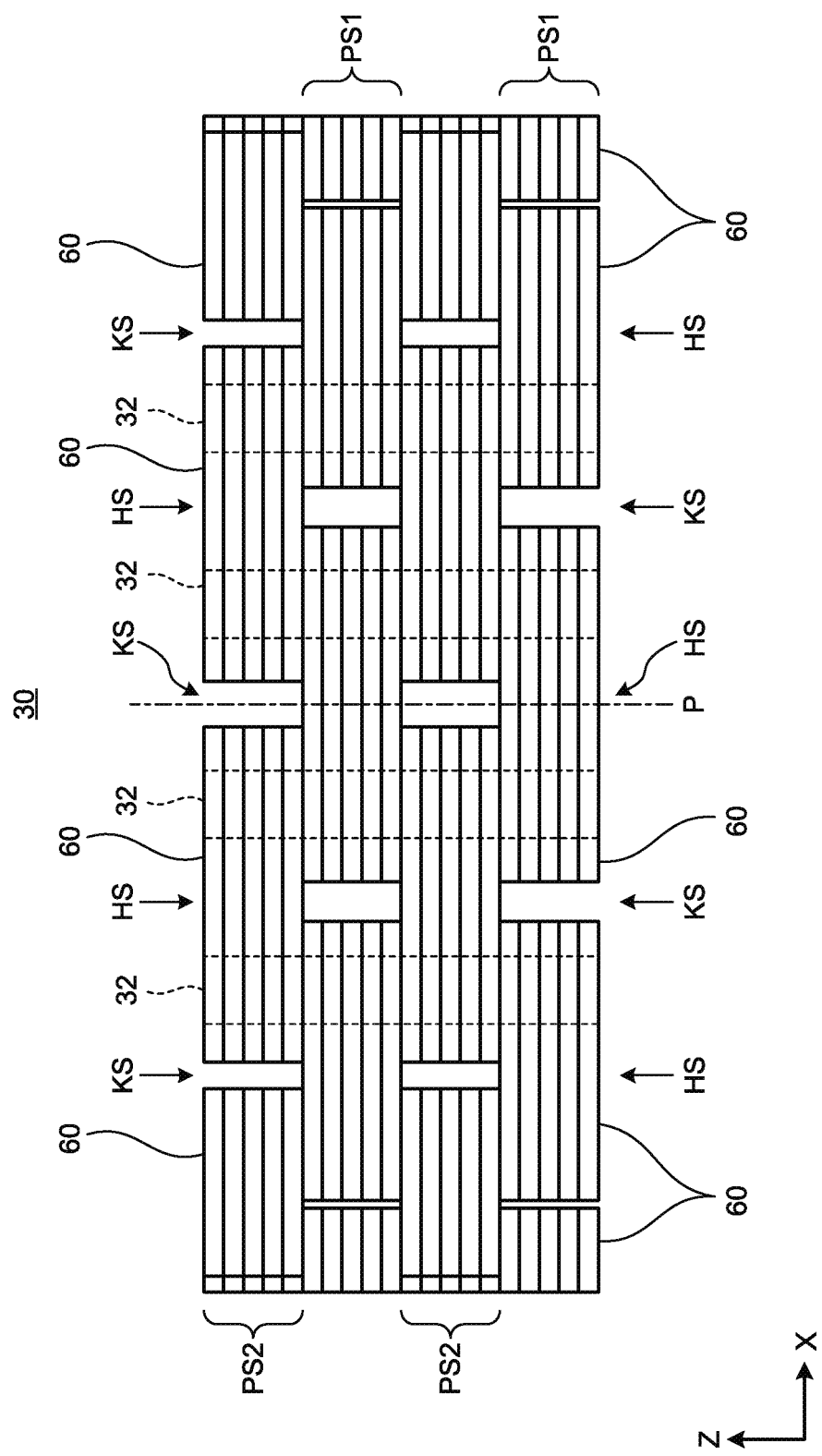
FIG. 13 is a view illustrating an example in a case where the magnetic steel sheet layers in the identical phase are laminated consecutively.

FIG. 13 is a view illustrating an example in a case where the magnetic steel sheet layers in the identical phase are laminated consecutively. In the example illustrated in FIG. 9, the phases in the arrangement of the magnetic steel sheets 60 adjacent to each other in the pivotal direction are different from each other, but this is merely an example of the relationship between the phases of the laminated magnetic steel sheet layers, and the present invention is not limited thereto. For example, as illustrated in FIG. 13, the number of the consecutive magnetic steel sheet layers in the identical phase may be two or more. The number of the consecutive magnetic steel sheet layers in the identical phase is the number of the magnetic steel sheet layers in the identical phase that are continuous along the pivotal direction. In the example illustrated in FIG. 13, the number of the consecutive magnetic steel sheet layers in the identical phase is five but may be any natural number such as four or less, and six or more.

Except for noteworthy features of differences between an electric motor with an inner rotor and an electric motor with an outer rotor, among the description of the outer stator 20, the description of the outer stator 20, the outer motor core 30, the edge 31, the core member 32, the coil 50, the magnetic steel sheet 60, the teeth 61, 61a and 61b, the basal portion 62, the intermediate portion 63, the closed slot HS, the open slot KS, the magnetic steel sheet layer PS1 in the first phase, and the magnetic steel sheet layer PS2 in the second phase can be read as the description of the inner stator 120 by replacing the above constituents with the inner stator 120, the inner motor core 130, the edge 131, the core member 132, the coil 150, the magnetic steel sheet 160, the teeth 161, 161a and 161b, the basal portion 162, the intermediate portion 163, the closed slot hs, the open slot ks, the magnetic steel sheet layer ps1 in the first phase, and the magnetic steel sheet layer ps2 in the second phase.

Figure 14:
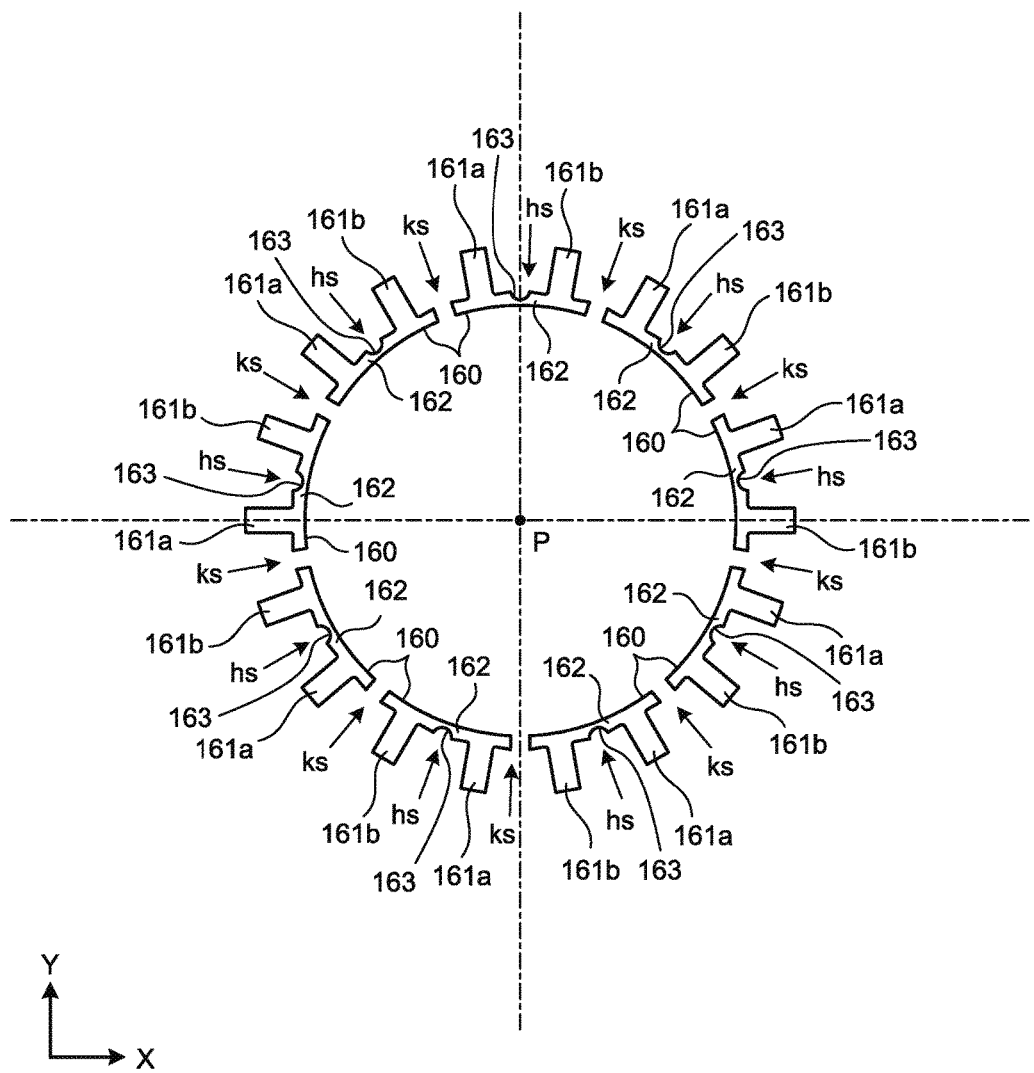
FIG. 14 is a view illustrating one of two phases in the arrangement of the magnetic steel sheets in one magnetic steel sheet layer.
Figure 15:
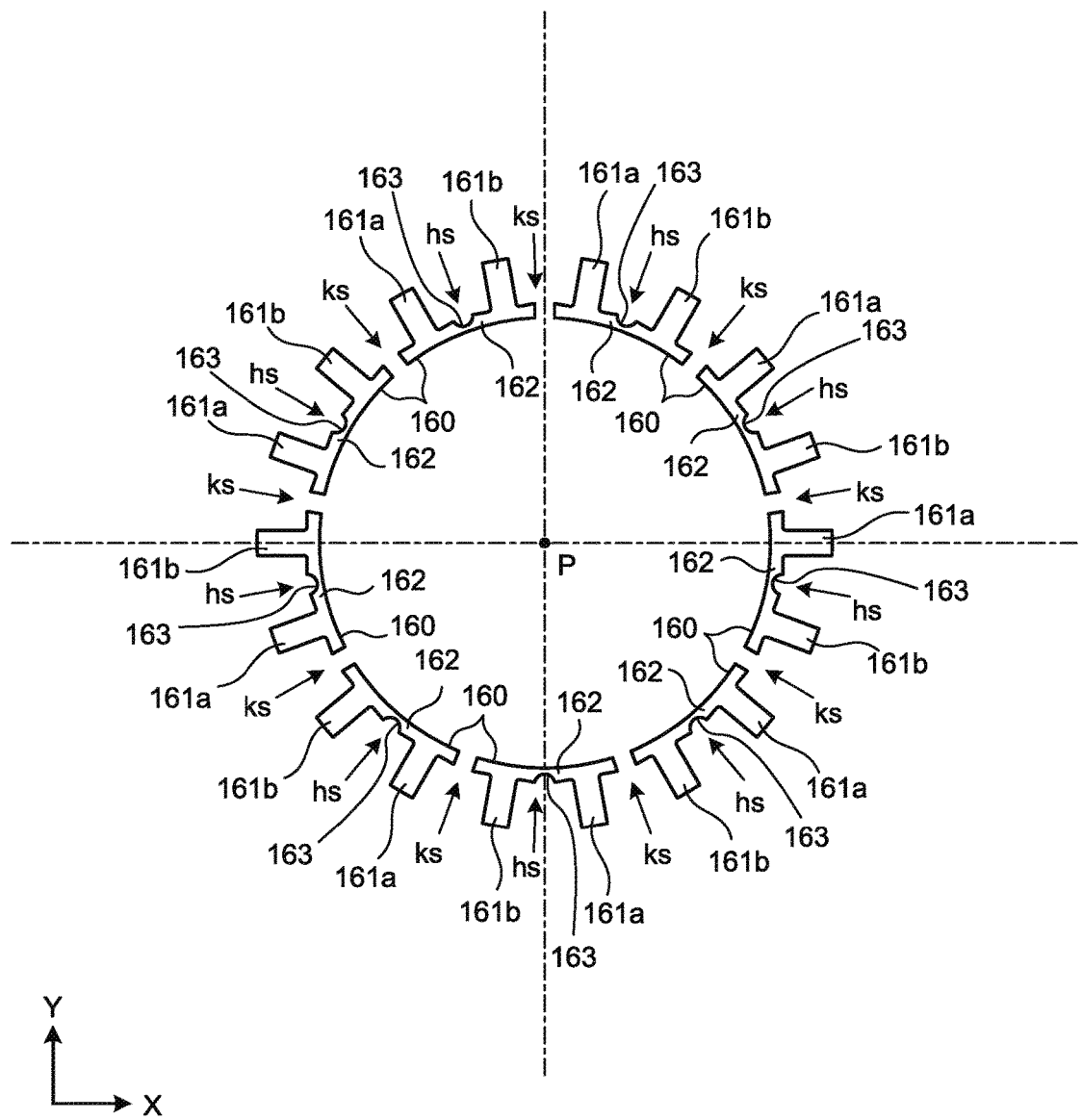
FIG. 15 is a view illustrating the other of the two phases in the arrangement of the magnetic steel sheets in one magnetic steel sheet layer.

FIG. 14 is a view illustrating one of two phases in the arrangement of the magnetic steel sheets 160 in one magnetic steel sheet layer. FIG. 15 is a view illustrating the other of the two phases in the arrangement of the magnetic steel sheets 160 in one magnetic steel sheet layer. In the inner stator 120 included in an electric motor of a so-called inner rotor such a motor positioned close to an inner shaft, the coils 150 are provided outside the inner motor core 130. Specifically, two teeth 161 protruding outward from the arc of the basal portion 162 are provided on the magnetic steel sheet 160. The basal portion 162 does not necessarily have an arc-like shape. For example, the basal portion 162 on the side from which the teeth 161 protrude may have a straight line shape perpendicular to the protruding direction of the teeth 161. The inner stator back yoke 140 is provided outside the inner motor core 130.

As described above, according to the second embodiment, the inner rotor 110, the inner stator 120, the outer stator 20, and the outer rotor 10 are sequentially arranged from the pivot P in the radial direction, and the non-magnetic body 45 or the like is interposed between the inner stator 120 and the outer stator 20. As a result, the non-magnetic body 45 or the like can prevent the interference of the magnetic field in each of the inner stator 120 and the outer stator 20. Accordingly, it is possible to further prevent the interference of the magnetic field.

The inner stator 120 includes the inner motor core 130 provided with the coils 150, the outer stator 20 includes the outer motor core 30 provided with the coils 50, and the non-magnetic body 45 or the like is positioned between the inner motor core 130 and the outer motor core 30. The non-magnetic body 45 or the like is interposed between the inner motor core 130 provided with the coils 150 and the outer motor core 30 provided with the coils 50, the coils 150 and 50 generating a magnetic field. Consequently, the interference of the magnetic field can be prevented more reliably.

The inner stator 120 also includes the cylindrical inner stator back yoke 140 provided outside the inner motor core 130. The outer stator 20 includes the cylindrical outer stator back yoke 40 provided inside the outer motor core 30. The non-magnetic body 45 or the like is positioned between the inner stator back yoke 140 and the outer stator back yoke 40. Accordingly, the shape of the non-magnetic body 45 or the like may be any shape as long as the non-magnetic body 45 or the like fits between the cylindrical inner stator back yoke 140 and the outer stator back yoke 40. Thus, the non-magnetic body 45 or the like can be provided more easily.

The non-magnetic body 45 or the like is an arc-like member having a cross-sectional shape in the direction perpendicular to the pivot P centering on the pivot P. Accordingly, the dual shaft integrated motor 1A is housed more easily in the cylindrical shape centering on the pivot P.

Furthermore, the non-magnetic body 45 or the like is made of a non-magnetic alloy or a resin. Accordingly, the non-magnetic body 45 or the like can prevent the interference of the magnetic field more reliably. The non-magnetic body 45 or the like may be made of a readily-available material, thereby preventing the interference of the magnetic field at low cost.

In addition, the detection unit 230 is positioned closer to the one end than the bearing unit 260 and the stator core unit 70, that is, positioned close to output shafts of the inner rotor 110 and the outer rotors 10, so that the shaft alignment of the first detection unit 240 and the second detection unit 250 and the gap adjustment of the rotation angles at which the inner rotor 110 and the outer rotor 10 are detected as 0 degree can be performed on the output shafts of the dual shaft integrated motor 1A. Accordingly, when the detection unit 230 is accessed at the time of the shaft alignment and the gap adjustment performed on the output shafts, it is possible to prevent the influence of physical shielding due to the arrangement of the bearing unit 260 and the stator core unit 70, thereby facilitating achievement of the detection accuracy of the detection unit 230 that detects the rotation angles of the two rotors. In addition, since the bearing unit 260 is positioned between the detection unit 230 and the stator core unit 70, the detection unit 230 and the stator core unit 70 are separated from each other, thereby reducing a magnetic influence from the stator core unit 70 to the detection unit 230.

Further, considering that the outer rotor 10 has relatively higher output torque than the inner rotor 110 because the magnitude of output torque of an electric motor depends on a distance from the pivot P to a thrust generation position (between a magnet and a coil), each magnet 112 and the inner stator 120 provided in the inner rotor 110 have the shaft lengths in the pivotal direction respectively longer than the shaft length of each magnet 12 and that of the outer stator 20 provided in the outer rotor 10. Accordingly, the thrust of the inner rotor 110 is made greater than that of the outer rotor, which easily leads to reduction in difference between the output torque of the outer rotor 10 and that of the inner rotor 110.

The positions of the first detection unit 240 and the second detection unit 250 are identical in the pivotal direction, thereby making the shaft length of the dual shaft integrated motor 1 more compact. Further, neither of the first detection unit 240 and the second detection unit 250 shields the other in the pivotal direction, thereby facilitating achievement of the detection accuracy of the detection unit 230 that detects the rotation angles of the two rotors.

Further, the position of the edge of the first bearing 261 close to the one end and the position of the edge of the second bearing 265 close to the one end are identical in the pivotal direction, thereby making the shaft length of the dual shaft integrated motor 1A more compact.

Further, the inner rotor 110, the stator core unit 70, and the outer rotor 10 are sequentially arranged from the pivot P, being directed outward in the radial direction. Accordingly, the inner stator 120 and the outer stator 20 can be collectively disposed between the inner rotor 110 and the outer rotor 10, thereby making the diameter of the dual shaft integrated motor 1A more compact.

Further, the first rotation unit 241, the first fixed portion 242, the second fixed portion 252, and the second rotation unit 251 are sequentially arranged from the pivot P, being directed outward in the radial direction. Accordingly, the first fixed portion 242 and the second fixed portion 252 can be collectively disposed between the first rotation unit 241 and second rotation unit 251, thereby making the diameter of the dual shaft integrated motor 1A more compact.

Further, the cover 291 that covers the first detection unit 240 and the second detection unit 250 is provided closer to the one end than the first detection unit 240 and the second detection unit 250. Providing the cover 291 after completing the shaft alignment and the gap adjustment can protect the detection unit 230.

Further, annually arranging the magnetic steel sheets 60 each including two teeth 61 allows more teeth 61 to be arranged in one magnetic steel sheet layer, thereby further reducing variations in shape of the teeth 61. In other words, since one magnetic steel sheet 60 includes two integrally formed teeth 61, accurately aligning the shape of these two teeth 61 leads to accurate alignment of the entire teeth 61. As the magnetic steel sheets 60 are disposed annularly in one magnetic steel sheet layer, even if one magnetic steel sheet 60 has magnetic directivity, one magnetic steel sheet layer is less likely to be influenced by the magnetic directivity of the one magnetic steel sheet 60, which further reduces variations in magnetic characteristics of the teeth 61. The magnetic steel sheet layers in which the magnetic steel sheets 60 each including two teeth 61 are arranged annularly are laminated in two different phases, so that a three-dimensional structure formed by laminating the magnetic steel sheet layers in different phases provides sufficient rigidity.

Further, the two phases in the arrangement of the magnetic steel sheets 60 are shifted from each other by one tooth 61. Accordingly, the magnetic steel sheets 60 each including the two teeth 61 are staggered at a position where the magnetic steel sheet layers in different phases are laminated. As a result, laminating the magnetic steel sheets 60 in different phases forms an annularly continuous structure, thereby providing sufficient rigidity as an annular structure.

Further, the two teeth 61 included in one magnetic steel sheet 60 are discontinuous on the opposite side of the outer rotor 10. Accordingly, the preformed coils 50 can be fitted in the core on which the teeth 61 are laminated, so that the coils 50 are provided easily.

Further, the magnetic steel sheets 60 are arranged in one magnetic steel sheet layer with a slot therebetween. Accordingly, it is possible to achieve weight saving as compared with a structure in which the magnetic steel sheet layer is completely continuous in an annular shape. In addition, it is also possible to prevent the flowing of the magnetism generated between the coils 50, thereby enhancing the efficiency of the dual shaft integrated motor 1A.

In addition, the number of the magnetic steel sheet layers in one of the two phases is equal to that in the other of the two phases. Accordingly, it is easy to balance the strength and the magnetic characteristics of the outer stator 20 as a whole.

Further, the phases in the arrangement of the magnetic steel sheets 60 between adjacent magnetic steel sheet layers in the pivotal direction are different from each other. Accordingly, the magnetic steel sheets 60 each including two teeth 61 are staggered at the position where two magnetic steel sheet layers are laminated. Therefore, laminating the magnetic steel sheets 60 in different phases forms an annularly continuous structure, thereby reliably providing sufficient rigidity as an annular structure body.

Further, in the basal portion 62 of one magnetic steel sheet 60 that physically connects two teeth 61, the part corresponding to the midpoint between the two teeth 61 is thinner than the other parts. Accordingly, it is possible to prevent the flowing of the magnetism generated between the coils 50 adjacent to each other in the annular direction, thereby achieving high efficiency of the dual shaft integrated motor 1A.

In addition, the outer stator 20 includes the cylindrical yoke provided on the opposite side of the outer rotor 10 with respect to the teeth 61, and the yoke is an integral member in the pivotal direction. Accordingly, the outer stator 20 is supported by the yoke integral in a lamination direction of the magnetic steel sheet layers, thereby providing sufficient rigidity.

In the first and second embodiments, the detection unit 230 is a resolver, but this configuration is for illustrative purposes, and does not limit the present invention. The detection unit 230 may be, for example, an optical encoder.

An example of use of the dual shaft integrated motor according to the first and second embodiments includes an actuator of various industrial machines such as a small component carrier device, an electronic component inspection device, and a semiconductor inspection device, but the present invention is not limited to these uses.

REFERENCE SIGNS LIST

1 DUAL SHAFT INTEGRATED MOTOR
10 OUTER ROTOR
11 OUTER ROTOR YOKE
11a, 111a OUTPUT TERMINAL
11b, 111b, 282 SCREW HOLE
12, 112 MAGNET
20 OUTER STATOR
30 OUTER MOTOR CORE
40 OUTER STATOR BACK YOKE
45, 45a NON-MAGNETIC BODY
45b, 45c NON-MAGNETIC MEMBER
50, 72, 76, 150 COIL
70, 270 STATOR CORE UNIT
71 FIRST CORE
73, 77 IRON CORE
75 SECOND CORE
80, 280 BASE
110 INNER ROTOR
111 INNER ROTOR YOKE
120 INNER STATOR
130 INNER MOTOR CORE
140 INNER STATOR BACK YOKE
230 DETECTION UNIT
231 BASAL PORTION
232, 233 FASTENER
240 FIRST DETECTION UNIT
241 FIRST ROTATION UNIT

242 FIRST FIXED PORTION
250 SECOND DETECTION UNIT
251 SECOND ROTATION UNIT
252 SECOND FIXED PORTION
260 BEARING UNIT
261 FIRST BEARING
262, 263, 266, 267 BEARING
265 SECOND BEARING
281 EXTENSION
291 COVER
292, 296 SCREW
P PIVOT

The invention claimed is:

1. A dual shaft integrated motor including an inner rotor and an outer rotor that are independently rotatable and rotate in an identical pivotal direction, the inner rotor and the outer rotor each having an output shaft positioned on one end of the pivotal direction, the dual shaft integrated motor comprising:
 a detection unit including a first detection unit configured to detect a rotation angle of the inner rotor, and a second detection unit configured to detect a rotation angle of the outer rotor;
 a bearing unit including a first bearing configured to rotate in conjunction with the inner rotor, and a second bearing configured to rotate in conjunction with the outer rotor;
 a stator core unit including a first core serving as a stator core of the inner rotor, and a second core serving as a stator core of the outer rotor; and
 a base to which the detection unit, the bearing unit, and the stator core unit are sequentially attached from the one end,
 wherein a magnet provided in the inner rotor and the first core each have a shaft length in the pivotal direction longer than a shaft length of a magnet provided in the outer rotor and a shaft length of the second core, and
 wherein a shaft length of the second bearing is longer than a shaft length of the first bearing and
 wherein the first bearing and second bearing are located at one end of the motor.

2. The dual shaft integrated motor according to claim 1, wherein
 a position of the first detection unit and a position of the second detection unit are identical in the pivotal direction.

3. The dual shaft integrated motor according to claim 1, wherein
 a position of an edge close to the one end of the first bearing and a position of an edge close to the one end of the second bearing are identical in the pivotal direction.

4. The dual shaft integrated motor according to claim 1, wherein
 the inner rotor, the stator core unit, and the outer rotor are sequentially arranged from the pivot, being directed outward in a radial direction.

5. The dual shaft integrated motor according to claim 1, wherein
 the first detection unit includes: a first rotation unit fixed to the inner rotor and configured to rotate together with the inner rotor; and a first fixed portion fixed to the base and configured to detect a rotation angle of the first rotation unit,
 the second detection unit includes: a second rotation unit fixed to the outer rotor and configured to rotate together with the outer rotor; and a second fixed portion fixed to the base and configured to detect a rotation angle of the second rotation unit, and
 the first rotation unit, the first fixed portion, the second fixed portion, and the second rotation unit are sequentially arranged from the pivot, being directed outward in a radial direction.

6. The dual shaft integrated motor according to claim 1, wherein
 the first detection unit and the second detection unit are provided on the one end with a cover configured to cover the first detection unit and the second detection unit.

* * * * *